US010832361B2

United States Patent
Mowatt et al.

(10) Patent No.: US 10,832,361 B2
(45) Date of Patent: Nov. 10, 2020

(54) USER-BASED LICENSING SYSTEM FOR IOT DEVICE RENTALS

(71) Applicant: Microsoft Technology Licensing, LLC, Redmond, WA (US)

(72) Inventors: David Mowatt, Dublin (IE); Stephen O'Driscoll, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 675 days.

(21) Appl. No.: 15/498,645

(22) Filed: Apr. 27, 2017

(65) Prior Publication Data

US 2018/0218466 A1    Aug. 2, 2018

Related U.S. Application Data

(60) Provisional application No. 62/451,236, filed on Jan. 27, 2017.

(51) Int. Cl.
*G06Q 30/00* (2012.01)
*G06Q 50/18* (2012.01)
*G06Q 30/06* (2012.01)

(52) U.S. Cl.
CPC ....... *G06Q 50/184* (2013.01); *G06Q 30/0635* (2013.01); *G06Q 30/0645* (2013.01)

(58) Field of Classification Search
CPC .............................. G06Q 30/06–08
USPC ............................. 705/26.1–27.2
See application file for complete search history.

(56) References Cited

U.S. PATENT DOCUMENTS

| 2002/0128853 | A1 | 9/2002 | Kikuchi et al. |
| 2008/0228578 | A1* | 9/2008 | Mashinsky ............. G06F 21/10 705/14.54 |
| 2015/0134954 | A1 | 5/2015 | Walley et al. |
| 2015/0201022 | A1 | 7/2015 | Kim et al. |
| 2016/0205106 | A1 | 7/2016 | Yacoub et al. |
| 2016/0259923 | A1 | 9/2016 | Papa et al. |
| 2016/0307168 | A1 | 10/2016 | Aneja et al. |
| 2016/0308957 | A1 | 10/2016 | Zhang et al. |

FOREIGN PATENT DOCUMENTS

| CN | 202257682 U | 5/2012 |
| CN | 105354935 A | 2/2016 |
| WO | 2016118979 A2 | 7/2016 |

OTHER PUBLICATIONS

Newcomb, Doug, "Archives for Connected Car", http://www.cthreereport.com/category/connected-car/page/2/, Retrieved on: Dec. 9, 2016, 25 pages.

* cited by examiner

*Primary Examiner* — Ethan D Civan

(57) ABSTRACT

Provided are methods and systems for the licensing of services associated with IoT devices that are under rental by users and/or that are shared between users. A comprehensive user-based licensing system connects services, users, and IoT devices with respect to licensing based on the particular context in which a device is being rented, one or more capabilities of the device being rented, availability of services for the particular device, and/or one or more characteristics of the user who is renting the device. The licensing system enables a user who is renting an IoT device to purchase one or more services associated with the device in conjunction with the rental.

8 Claims, 8 Drawing Sheets

USER-BASED LICENSING SYSTEM FOR IOT DEVICE RENTALS

This application claims the benefit of U.S. Provisional Patent Application No. 62/451,236, entitled "User-Based Licensing System For IoT Device Rentals," filed on Jan. 27, 2017, which is hereby expressly incorporated herein by reference in its entirety.

BACKGROUND

There has been significant penetration in the consumer market with "Internet of Things" (IoT) devices. A large portion of the initial wave of IoT technology introduced to consumers involved wearable devices (e.g., "smart" watches, fitness trackers, etc.). Following such wearable devices, IoT technology expanded to devices that operate in a user's home, and any services that are usable with such devices are made available to users who have purchased the device through various device-based licensing.

Today's IoT devices are focused on consumers who buy a device and who buy additional services with device-based licensing. A user who purchases an IoT device is clearly the owner of such device, and additional services for the particular device are often made available for the user to purchase as well. As IoT devices become increasingly commonplace, diversified, and (at times) expensive, more and more users will become interested in renting such devices rather than purchasing them outright. However, there is presently no system in place for user-based licensing of IoT devices.

Existing approaches include devices that allow service providers to sell their services to a particular consumer. However, such existing approaches and devices are not targeted at the rental market, often involve very complex infrastructures, and they do not offer mechanical/sensory capabilities (e.g., the devices consist of merely a computer with a screen).

There are also other solutions offered by certain hospitality venues such as hotels, which upsell certain services (e.g., TV channels). However, these alternatives do not include a system that allows a user to purchase the services from the provider (e.g., Disney Channel) in a way that offers a single mechanism for user identity verification.

SUMMARY

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely presents some of the concepts of the disclosure as a prelude to the more detailed description provided thereafter.

The present disclosure relates generally to providing services to users of electronic devices and, more particularly, to licensing services associated with devices that have been rented by users.

One embodiment of the present disclosure relates to a computer-implemented method for licensing services associated with a network-connectable device, the method comprising: receiving a request for rental of a network-connectable device for a user; receiving, from the user, a request to purchase one or more services associated with the device, wherein the request to purchase one or more services is received in conjunction with the request for rental of the device or separately from the request for rental of the device; storing, for the user, (i) data about the rental of the device and (ii) data about a license associated with each of the one or more services purchased by the user; determining an identity of the user based on data received from the device; determining at least one service, of the one or more services purchased by the user, compatible with the device, wherein the at least one service is determined based on at least one characteristic of the device; and configuring an availability of the at least one service on the device based on a state of the license associated with the at least one service.

Another embodiment of the present disclosure relates to a system for licensing services associated with a network-connectable device, the system comprising one or more processors and a non-transitory computer-readable medium coupled to the one or more processors having instructions stored thereon that, when executed by the one or more processors, cause the one or more processors to perform operations comprising: receiving a request for rental of a network-connectable device for a user; receiving a request from a user to purchase one or more services associated with the device, wherein the request to purchase one or more services is received in conjunction with the request for rental of the device or separately from the request for rental of the device; storing, for the user, (i) data about the rental of the device and (ii) data about a license associated with each of the one or more services purchased by the user; determining an identity of the user based on data received from the device; determining at least one service, of the one or more services purchased by the user, compatible with the device, wherein the at least one service is determined based on at least one characteristic of the device; and configuring an availability of the at least one service on the device based on a state of the license associated with the at least one service.

Yet another embodiment of the present disclosure relates to a tangible, non-transitory computer readable medium, or media, storing machine readable instructions that, when executed by one or more processors, cause the one or more processors to perform operations comprising: receiving a request for rental of a network-connectable device for a user; receiving a request from a user to purchase one or more services associated with the device, wherein the request to purchase one or more services is received in conjunction with the request for rental of the device or separately from the request for rental of the device; storing, for the user, (i) data about the rental of the device and (ii) data about a license associated with each of the one or more services purchased by the user; determining an identity of the user based on data received from the device; determining at least one service, of the one or more services purchased by the user, compatible with the device, wherein the at least one service is determined based on at least one characteristic of the device; and configuring an availability of the at least one service on the device based on a state of the license associated with the at least one service.

Further scope of applicability of the methods and systems of the present disclosure will become apparent from the more detailed description given below. However, it should be understood that the following detailed description and specific examples, while indicating embodiments of the methods and systems, are given by way of illustration only, since various changes and modifications within the spirit and scope of the concepts disclosed herein will become apparent to those skilled in the art from the following detailed description.

BRIEF DESCRIPTION OF THE DRAWINGS

These and other objects, features, and characteristics of the present disclosure will become more apparent to those skilled in the art from a study of the detailed description that follows in conjunction with the appended claims and drawings, all of which form a part of this specification. In the drawings:

Figure 1:
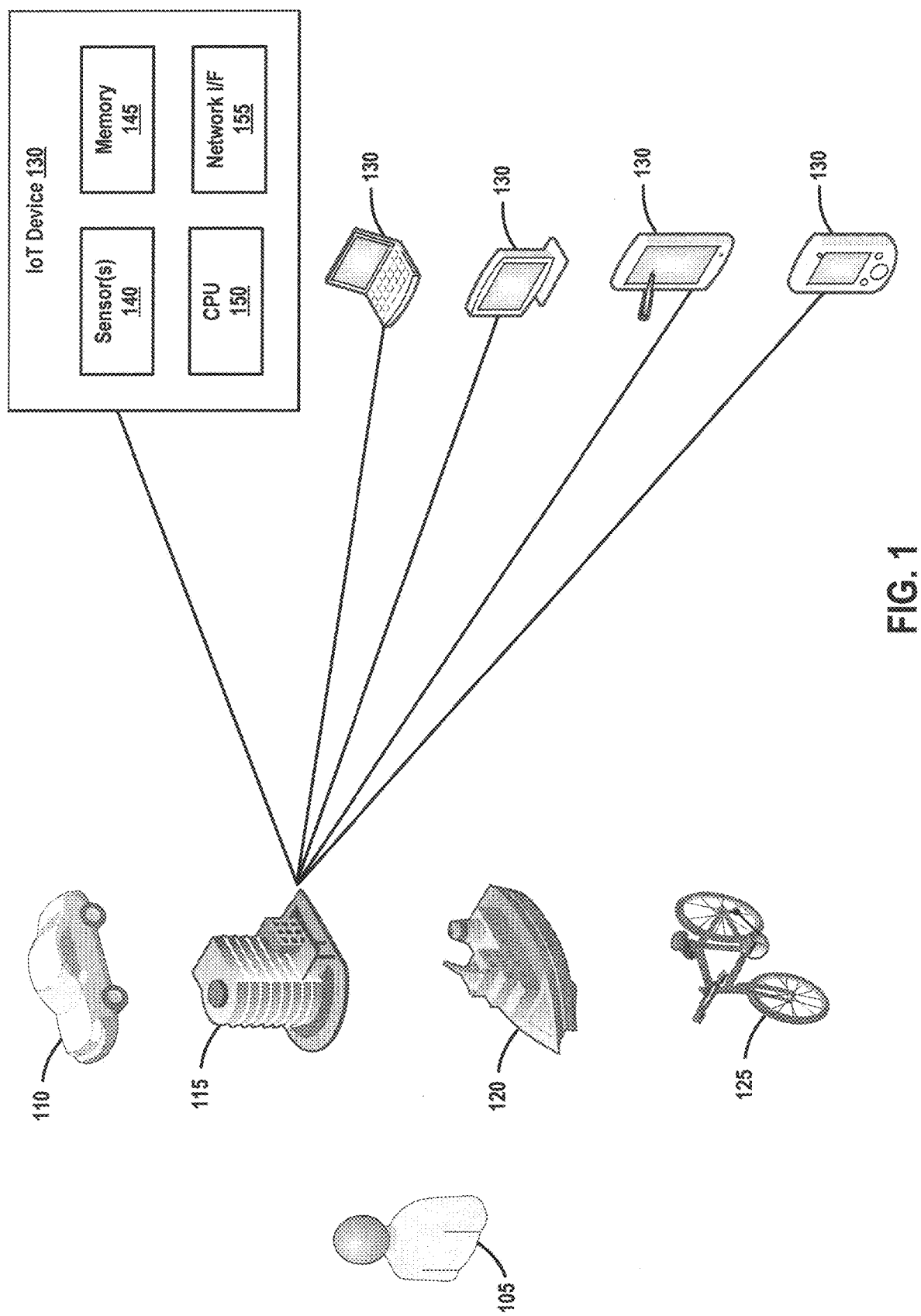
FIG. 1 is a diagram illustrating a high-level example environment in which one or more embodiments described herein may be implemented.

The headings provided herein are for convenience only and do not necessarily affect the scope or meaning of what is claimed in the present disclosure.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

Embodiments of the present disclosure relate to a system for licensing services associated with devices (e.g., IoT devices) that are under rental by users and/or that are shared between users. As will be described in greater detail herein, in accordance with one or more embodiments, the system is comprehensive in nature, in that the system connects services, users, and IoT devices with respect to licensing based on, for example, the particular context in which a device is being rented, one or more capabilities of the device being rented, availability of services for the particular device, and/or one or more characteristics of the user who is renting the device.

In accordance with at least one embodiment, the licensing system of the present disclosure is designed to allow a user who is renting a device to purchase one or more services associated with the device.

In an embodiment, the party (e.g., entity) renting the device (e.g., the rental company, the rental agency, etc.) to the user may offer to the user one or more services associated with the rental device. For purposes of brevity, the party or entity renting a device to the user is sometimes referred to herein simply as the "renter." In one example, services associated with the rental device may be offered by the renter for purchase by the user. In another example, the renter may offer one or more services associated with the device to the user for a trial period, which may be at no additional cost to the user. Such a trial period may be, for example, a predefined period of time during which the user is granted a temporary license to use a given service in conjunction with the rental device. Depending on the particular arrangement between the renter and the user, once the trial period has ended, the temporary license granted to the user may expire and the service may no longer be accessible to the user, or the temporary license granted to the user may automatically be converted to a paid-for or purchased license for the service, in which the user is charged for the continuing use of the service beyond the expiration of the trial period. In yet another example, the renter may combine one or more services associated with a device with the rental of the device itself, so as to form a packaged offering of the rental device and associated services.

In at least some embodiments, the licensing system described herein is designed such that a user who has rented a device may also purchase one or more services associated with a rental device from parties or entities other than the renter. Such services may be purchased by the user in addition to, or instead of, any services purchased directly from the renter, in accordance with an embodiment. For example, the user may purchase additional services associated with the rental device directly from one or more providers of the services, from one or more other renters of devices, and the like. In the case of the user purchasing one or more additional services associated with the rental device directly from a service provider, the service provider may have their own portal (and associated databases) where users are able to register and make payment for the additional services purchased for use with the rental device. In accordance with at least one embodiment, data about services that users have purchased directly from service providers may be made available (e.g., provided to, retrieved by, or otherwise accessible by) to the licensing system to synchronize with relevant data already stored in the databases of the system.

As will described in greater detail below, in at least one embodiment, the system may be designed to enable the user to purchase additional services associated with the rental device (e.g., directly from service providers, from other renters of devices, etc.) without requiring the user to re-establish his or her identity (e.g., sign into or authenticate with each applicable system of the service providers or other renters) in multiple different ways.

An example scenario in which one or more embodiments of the system described herein may be utilized involves a user who can rent an IoT device and then subscribe to different levels of functionality of the device (e.g., by licensing one or more services available for use in conjunction with the IoT device) for the duration of using the device. One example is a "smart" bicycle that a user can rent to get from one place to the next, but where the capabilities built-in to the handlebars of the bicycle (e.g., from route planning, notifications, ability to notify of road closures, etc.) depends on the license purchased by the user. Another example is a rented toolkit that allows a user to perform a physical survey of their house, where device calibration or precision of GPS coordinate tracking may be dependent on the license purchased by the user. Yet another example context in which the system of the present disclosure has useful application is with hotels or apartments, where a range of IoT devices are made available to guests (or renters of the apartment) on a temporary basis, and the services that the guests are able to access or receive through the IoT devices (e.g., premium coffee to control over air purification) depend on the particular "package" (e.g., collection of service licenses) that the guests have purchased for the duration of their stay.

As will be described in greater detail below, the methods and systems of the present disclosure provide a mechanism for multiple service providers to register their respective services that may be, for example, pre-installed or installable across a range of IoT devices. In at least one embodiment, the user-based licensing system is capable of determining, tracking, and providing information about which users have purchased which levels of a particular license for a service. For example, in accordance with one embodiment, each IoT device of the system (e.g., each IoT device registered with the system) is configured to, or otherwise capable of, identifying a current user of the device (e.g., based on a unique identifier associated with the user or with a mobile device of the user, such as, for example, a fingerprint signature of the user, a Bluetooth or other short-range communication signal received from a device operated by the user, etc.), retrieving or otherwise obtaining for the identified user (and for all services installed on the IoT device) data indicating which levels of a given license the user has purchased (e.g., trial license, basic license, premium license, expired license, etc.), and providing this data and information to each of the services associated with the device. For example, while a particular device rented by a user may have basic capability and functionality without any purchased licenses for services associated with the device, additional capabilities and/or functionalities of the device may be enabled or accessed through the purchase of one or more services by the user.

FIG. 1 shows a high-level example environment in which the user-based licensing system of the present disclosure may be implemented, in accordance with one or more embodiments. As described above, there are numerous contexts in which the licensing system has useful application. An example of such a context is where a user 105 rents a thing (e.g., a tangible object), such as a motor vehicle 110, a hotel room 115, a boat 120, a bicycle 125, or any of a variety of other such things that are typically made available for users to rent, and the rented item includes or comes with one or more IoT devices 130. For example, when a user rents a hotel room 115, the hotel room 115 often includes multiple IoT devices 130 (e.g., "smart" TV, phones, tablet computers, laptops, etc.) that may require the user to subscribe or purchase one or more services in order to enjoy the full functionalities of the devices 130.

One or more of the IoT devices 130 may include one or more sensors 140 or sensing devices, a memory 145, a CPU 150, and a network interface (I/F) 155. However, it should be noted that any or all of the IoT devices 130 may include other components in addition to or instead of the example components described above, and that the example components shown are in no way intended to limit to scope of the present disclosure or limit the range of IoT devices that may be utilized in connection with the system described herein.

It should also be understood that the IoT devices 130 shown are merely a few examples of the many IoT devices that may be made available to users with the rental of certain products. The examples shown are in no way intended to limit the scope of the present disclosure, and it should be appreciated that various other IoT devices may be made available in connection with the same or other rental items (e.g., motor vehicle 110, hotel room 115, boat 120, bicycle 125, etc.), in addition to or instead of the example IoT devices described above.

Figure 2:
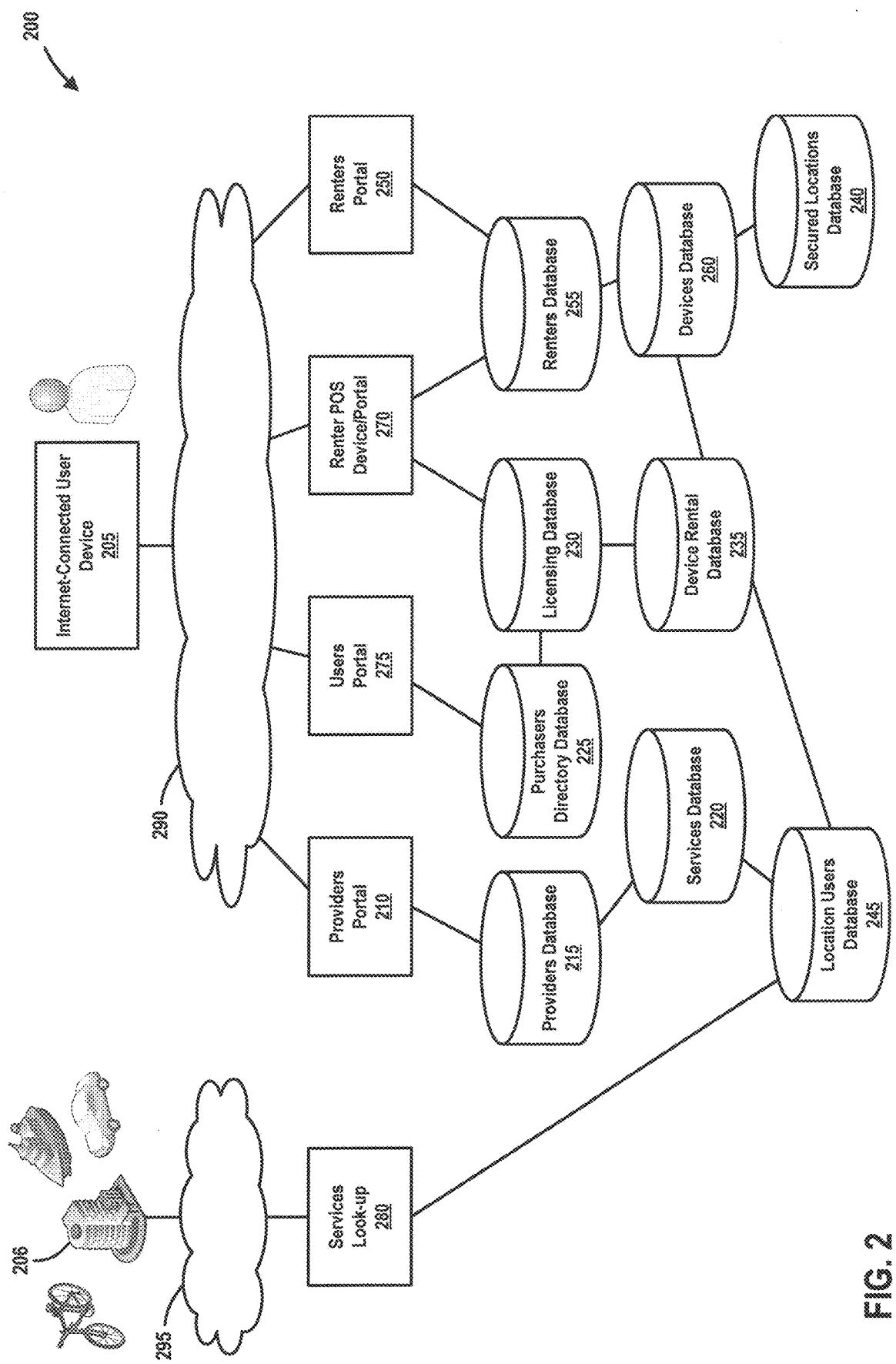
FIG. 2 is a block diagram illustrating an example system for licensing services associated with device rentals, according to one or more embodiments described herein.

FIG. 2 is an example system 200 for licensing services associated with device rentals. In accordance with one or more embodiments described herein, the system 200 may include one or more servers and/or one or more databases, some or all of which are network-connected (e.g., to one or both of networks 290 and 295), such as Purchasers Directory Database 225, Licensing Database 230, Device Rental Database 235, Secured Locations Database 240, and Location Users Database 245. In at least some embodiments, the system 200, which is network-connected, may also include one or more portals (e.g., websites, one or more of which may be a specially designed website) and/or devices, such as Providers Portal 210, Users Portal 275, Renter Point-of-Sale (POS) Device or Portal 270, and Renters Portal 250. The various servers, portals, and/or devices that may be included in the system 200 are connected to one or more relevant databases to deliver certain services, according to an embodiment. It should be noted that one or more of the example portals in system 200 (e.g., Providers Portal 210, Users Portal 275, Renter POS Device/Portal 270, and/or Renters Portal 250) are Internet accessible such that users (e.g., a service provider, a renter, a purchaser or potential purchaser, etc.) can access the various portals over the Internet via, for example, an Internet-connected user device 205 (e.g., a personal computer, smartphone, etc.).

The Providers Portal 210 may be configured to allow service providers to register one or more of their services with the system 200. In an embodiment, Providers Portal 210 may include one or both of Providers Database 215 and Services Database 220. In one or more other embodiments, Providers Portal 210 may include neither the Providers Database 215 nor the Services Database 220. In such other embodiments, one or both of Providers Database 215 and Services Database 220 may be separate components of the system 200, or may be combined into a single database, or may be combined or incorporated into one or more other databases in the system 200. For example, in an embodiment, the Services Database 220 may be a part of the Providers Database 215.

In at least some embodiments, the Renters Portal 210 may be configured to allow device rental agencies (e.g., renters) to register one or more of their IoT devices with the system 200. In an embodiment, Renters Portal 250 may include one or both of Renters Database 255 and Devices Database 260. In one or more other embodiments, Renters Portal 250 may include neither the Renters Database 255 nor the Devices Database 260. In such other embodiments, one or both of Renters Database 255 and Devices Database 260 may be separate components of the system 200, or may be combined into a single database, or may be combined or incorporated into one or more other databases in the system 200. For example, in an embodiment, the Devices Database 260 may be a part of the Renters Database 255.

It should be understood that in one or more other embodiments, the example system 200 may include other components in addition to or instead of the example components mentioned above. Similarly, the system 200 for licensing services associated with device rentals may include fewer components than the number of example components shown, or one or more of the example components shown may be combined, without departing from the operations, features, or functionalities of the system as described herein. It should also be understood that the connections between the various servers, databases, portals, and/or devices shown in the system 200 are merely an example of one way in which the servers, databases, portals, and/or devices may be interconnected or arranged within the system 200, and that any or all of the components may be connected or arranged in numerous other ways in addition to or instead of the example manner shown.

In at least some embodiments, the example system 200 also includes one or more networks 290, 295. One or both of networks 290 and 295 may be a local area network (LAN), a wide area network (WAN), the Internet, or a combination thereof. Networks 290 and 295 connect the various servers and databases (e.g., Purchasers Directory Database 225, Licensing Database 230, Device Rental Database 235, Secured Locations Database 240, Location Users Database 245, etc.), the various portals and/or devices (e.g., Providers Portal 210, Users Portal 275, Renter POS Device/Portal 270, Renters Portal 250, etc.), and can also connect additional devices, servers, and/or databases of the same or different type (not shown). In one or more embodiments, network 295 may connect various secured locations 206 to one or more components of the system 200.

The Providers Database 215 may be configured to include (e.g., store, maintain, etc.) data and information on providers of the services that can be registered with the system 200. In at least one embodiment, a service provider may be, for example, an entity or business that provides computer-based services (e.g., access to a particular software application or program) to consumers over a network or the Internet. Such service offerings may be used, for example, in conjunction with various types of devices including IoT devices. In accordance with an embodiment, the Providers Database 215 may include identifying information for service providers of the various services registered with the system 200. Such identifying information may include, for example, contact details associated with each of the service providers, an online or electronic identifier for the service provider (e.g., an organizational ID), which in some embodiments may be created and assigned to the service provider by the system 200 upon registration. In at least one embodiment, the Providers Database 215 may include information related to price points (e.g., $5.29/day, etc.) for each of the services registered with the system 200. As a non-limiting example, Microsoft may be the service provider of a Mapping Service, which can be licensed by users at a cost of $2.00 per day.

In at least one embodiment, the Providers Database 215, which may be part of the Providers Portal 210, may be configured to enable a service provider to set up an account such that funds (e.g., monetary funds) can be transferred from the system 200 to one or more private accounts (e.g., bank accounts) of the service provider. For example, a service provider who has registered one or more services with the system 200 may utilize the Providers Database 215 to submit information regarding an outside (e.g., external) account to which the service provider would like monetary funds to be sent when such funds are paid by a user for the licensing of the one or more services provided by the service provider. In some embodiments, such a service offered by the Providers Database 215 may be shared with that of seller registration with an app store providing similar capabilities.

The Services Database 220 may be configured to store, maintain, organize, etc., data about services associated with each service provider that may be available on one or more IoT devices, in an embodiment. For example, in at least one embodiment, a service (e.g., a global positioning system (GPS), route navigation program, etc.) may have a unique identifier associated with it. The unique identifier may be mapped to the service, and additional details about the service, in the Services Database 220, to enable efficient lookup and retrieval (e.g., when the system 200 determines which services of a service provider are to be made available for purchase to a user who is renting a device). In accordance with at least one embodiment, the Services Database 220 may include, for each service registered with the system 200, data (e.g., a list) about which versions (e.g., classes) of various IoT devices the service supports. For example, in an embodiment, such data about the versions of the IoT devices supported by the service may be maintained in the Services Database 220 using a set of identifiers. One example of such a set of identifiers may be a globally unique identifier (GUID) or a name, together with a version (e.g., class) indicator (e.g., "Fabrikam Smart Bike"/"Version: 2.3"). In one or more other embodiments, the data about which versions of various IoT devices each service supports may be maintained in the Services Database 220 in one or more other suitable ways.

In accordance with at least one embodiment, the Purchasers Directory Database 225 may include a mapping of unique identifiers for users (e.g., purchasers or potential purchasers of services) registered with the system 200 to unique "system" identities (e.g., "User IDs" specific to each user for use with the system 200). In an embodiment, the unique identifiers for registered users may include, for example, a fingerprint signature, a telephone number, an online identity (e.g., e-mail or username), or the like. In some implementations, the unique identifier for a given user may be a dynamically-generated identifier associated with a particular context, such as, for example, "Westin hotel guest/Bellevue suites/room 403/checkin 10/11/18." It should be appreciated that various other suitable unique identifiers may be used to identify users registered with the system 200 in addition to or instead of the example identifiers described above.

The Licensing Database 230, in at least one embodiment, may include a mapping of each user ID (e.g., the user identity assigned to each user by the system 200 upon registration) to one or more service licenses. Each service license that may be stored in the Licensing Database 230 may include, for example, some or all of the following information: a service identifier ("service ID" that is associated with the particular service), a license state (e.g., standard paid license, premium paid license, free license, trial license (e.g., temporary license during trial period), limited or restricted license, expired license, renewed license, etc.), a license start time and/or date (e.g., which may be used to determine whether a given user's license is expired), a license end time and/or date, a duration of the license, and the like. In one or more embodiments, each service license that may be stored in the Licensing Database 230 may include an enumeration of additional services purchased under that service license and/or additional data associated with the service license. Such additional services and/or information may include, for example, details about a location or service associated with the license (e.g., a geographical restriction on where the license is valid such as, for example, that the license is restricted to work only within a designated "Reading Area" and not outside of such designated area), notifications or alerts associated with the underlying service (e.g., "Road Closure Alerts: 300 alerts remaining"), and the like. It should be noted that, in accordance with one or more embodiments, the additional services purchased under or associated with the service license may be categorized as durable or consumable "in-app" purchases. For example, when a "durable" service is purchased, the service acquired by the user is permanent (e.g., is usable or accessible for the duration of the license), while a "consumable" service is one that gets used up and then must be replaced or replenished (e.g., where there is a specific quantity or number of occurrences tied to the service). An example of a consumable service could be where a user purchases ten weather alerts, and after the tenth weather alert is received, the service ends or is no longer accessible by the user.

The Renters Database 255, which in some embodiments may be a part of the Renters Portal 250, may include data about agencies or companies engaged in or offering IoT device rentals (e.g., "Bob's Construction Tools," "Westin Hotels," "Reading City Smart Bike Scheme," etc.). In at least one embodiment, the data about the device rental agencies (e.g., renters) that may be stored, organized, or otherwise maintained in the Renters Database 255 may include, for example, contact details associated with each of the device rental agencies, an online or electronic identifier for the device rental agency (e.g., an organizational ID), which in some embodiments may be created and assigned to the device rental agency by the system 200 upon registration, as well as details about external accounts (e.g., bank accounts) associated with the device rental agency. In some embodiments, the Renters Database 255 may include information related to price points (e.g., $10.00/hour, etc.) for renting various IoT devices (each of which has its own ID) registered with the system 200.

In accordance with one or more embodiments, the Renters Database 255 may be configured to enable a device rental agency to setup an account such that funds (e.g., monetary funds) can be transferred from the system 200 to one or more private accounts (e.g., bank accounts) of the device rental agency. For example, a device rental agency who has registered one or more IoT devices with the system 200 may utilize the Renters Database 255 to submit information regarding an outside (e.g., external) account to which the device rental agency would like monetary funds to be sent when such funds are paid by a user for the rental of the one or more IoT devices provided by the device rental agency.

The Devices Database 260 may be configured to store, maintain, organize, etc., data about IoT devices associated with each device rental agency that may be available for users to rent, and that may be used in conjunction with various services that may be purchased by users, in an embodiment. For example, in at least one embodiment, each IoT device (e.g., "Fabrikam Smart Bike"/"Version: 2.3") may have a unique identifier associated with it (e.g., for the particular instance of the IoT device, where the rental agency may have more than one of the same device type). The unique identifier may be mapped to the IoT device, and additional details about the IoT device, in the Devices Database 260, to enable efficient lookup and retrieval of any services that may be associated with the device (e.g., when the system 200 determines which services of a service provider are to be made available for purchase to a user who is renting the IoT device). In accordance with at least one embodiment, the Renters Database 260 may include, for each IoT device registered with the system 200, data (e.g., a list) about which versions of various services are supported by the particular IoT device. For example, in an embodiment, such data about the versions of the services supported by the device may be maintained in the Devices Database 260 using a set of identifiers. One example of such a set of identifiers may be a globally unique identifier (GUID) or a name, together with a version indicator (e.g., "Route Navigation System 2.1"). In one or more other embodiments, the data about which versions of various services each IoT device supports may be maintained in the Devices Database 260 in one or more other suitable ways.

In one or more embodiments, the example system 200 for licensing services associated with device rentals may include a Secured Locations Database 240. The Secured Locations Database 240 may store, organize, and otherwise maintain data about various "secured" locations such as, for example, apartment buildings, rental cars, rental boats, hotel rooms, recreational vehicles, and the like. In at least one embodiment, the Secured Locations Database 240 may be a part of the Devices Database 260 (described in detail above) since secured locations may be registered with the system 200 in a way that is agnostic to the users of the secured locations (e.g., data about which is stored in the Location Users Database 245, described in detail below). In at least some embodiments in which the system 200 includes a Secured Locations Database 240, such secured locations may typically have associated with them multiple IoT devices. For example, when a user rents a hotel room, the hotel room may be provided with a range of IoT devices contained within including, for example, a smart television, a computer tablet, a smart coffee machine, etc. The Secured Locations Database 240 may include, for each secured location registered with the system 200, data such as a renter ID associated with the location (e.g., an identifier of the owner of the location, such as "Westin Hotel," "Hertz," etc.), as well as a list of device IDs associated with the IoT devices available at the location. In one or more embodiments in which a Secured Locations Database 240 is present, the system 200 may also include a Location Users Database 245, which may record and store data about which users registered with the system 200 (and recorded in the Purchasers Directory Database 225) are using which secured locations. The Location Users Database 245 may also include such information as the starting time and/or date that each user began using the secured location, as well as the ending time and/or date for the user to stop using the secured location.

The Device Rentals Database 235 may be configured to store, organize, and otherwise maintain data about which device IDs (e.g., as maintained in the Devices Database 260) are being rented, or have been rented, to each user registered in the system 200 (and recorded in the Purchasers Directory Database 225), in accordance with at least one embodiment. The Device Rentals Database 235 may also include various other data associated with current or past rentals of IoT devices by users, including, for example, starting time and/or date for each rental period, ending time and/or date for each rental period, a renter ID associated with the device rental agency for each IoT device that is rented to a user, as well as other such relevant information. In accordance with at least one embodiment, the data maintained in the Device Rentals Database 235 may be used to enforce licensing restrictions in certain situations. For example, a user who has rented an IoT device (e.g., a guitar) may find that the device itself stops working (e.g., stops playing any music) or has limited operation (e.g., limited capabilities), and any services on the device that would otherwise be licensed stop working as well, if the user has not returned the device to the renter at the agreed upon time, and has not paid to rent the device for additional time. While some services may allow continued usage of the device beyond the expiration of the license, and simply charge the user additional costs, in some implementations, the device itself and/or its services may stop functioning if the rental period has been exceeded.

It should be noted that the precise manner in which a user requests a device rental, pays for the device rental, and is presented with available services for purchase in conjunction with a device rental may vary depending on the particular implementation of the system as well as the particular context. For example, in some scenarios (e.g., a construction equipment rental office), the user may be present at the physical office of a device rental company, pay at a "point-of-sale" device for a given device rental (e.g., a surveying toolkit for a period of three days), and may purchase an extra service associated with the device (e.g., a GPS calibration service) from a list of available services for that device that is presented to the user by the renter. For example, in accordance with at least one embodiment, the renter may scan the IoT device to retrieve its device ID and device type using, for example, a barcode, RFID chip, or tag associated with the device, or using some other suitable technology for uniquely identifying the device.

In one or more embodiments, the system for licensing services associated with device rentals (e.g., system 200 shown in FIG. 2 and described in detail above) may host a website where, for example, a device rental agency can sign in, enter identification information for an IoT device (e.g., by scanning a barcode or other identifying tag associated with the device), and obtain access to a list of available services to purchase for the device. The user may specify the desired duration to rent, plus the list of desired extra services. In some embodiments, a similar service may be offered to users at a point-of-sale (PoS) device at a rental agency, where, for example, a user can specify a desired duration to rent a given IoT device, and also indicate which additional services are desired for use with the IoT device rental.

It should be noted that, in accordance with one or more embodiments, if a user who requests a device rental is not a known user within the system (e.g., is not recorded in the Purchasers Directory Database 225 of the example system 200 shown in FIG. 2), the user may be registered with the system at the time of making the rental request. For example, in a scenario where a user is present in a device rental agency's premises (e.g., office), the user may initiate the registration process with the system by interacting with the particular device that the user wishes to rent. For example, the user may utilize a fingerprint scanning function of the device in order to have the details of the user's fingerprint signature captured by the device and transmitted (e.g., via a suitable communication network present at the device rental agency's office such as, for example, a WLAN, or via Bluetooth, etc.) to a server of the system for recording in the appropriate database (e.g., Purchasers Directory Database 225). In at least one embodiment, the device ID associated with the particular device may also be transmitted with the user's registration details so that, for example, an appropriate record of the device rental may be created in the system (e.g., in the Device Rental Database 235), and one or more services associated with the device may be presented to the user for purchase in conjunction with the rental.

In some embodiments, when a user who is already registered with the system goes to use a particular IoT device (whether the device has already been rented by the user or the device is part of a secured location), the device itself may first collect identification details from the user. For example, depending on the capabilities of the particular device, the user's identification details may be collected through the detection of the user's smartphone, the recognition of the user's fingerprint, or by some other suitable method. The device may then communicate with the system (e.g., via a communication network to which the device is connected) to exchange various data, such as the user's identification details, with the system's licensing database to retrieve any services associate with the device that should be enabled for the user (e.g., where such services have been purchased by the user).

Considering that IoT devices (which could range, for example, from automatic watering systems for trees, to smart bikes, to electric guitars, and the like) may not always be used in internet-connected locations, in accordance with one or more embodiments, a set of locally-cached licenses may be used by the system for licensing services associated with device rentals. For example, the system may have a strong private key/public key approach where it generates a license for the combination of, for example, "device ID, service ID, license type, expiration date." In at least one embodiment, the license may also contain the user ID for the particular user for use with identification methods that do not require network or Internet connectivity (e.g., fingerprint signature verification). For example, a license signature may get generated for the identification information using a strong private key that is securely stored within the system. These temporary offline license keys may be sent to the IoT device such that they can be retrieved by the services running on the IoT device, and their integrity may be verified using a "public key" that is stored locally on the IoT device. This could allow a service purchased in conjunction with a device rental (e.g., a speed tracking service installed on or connected to a rented bicycle) to operate for some predetermined period of time (e.g., up to 24 hours) before the device rental re-establishes connectivity with the Internet. In some implementations, a warning light or other notification may alert the user if the IoT device rental has not been connected to the Internet for some period of time, thereby indicating to the user that their service licenses are approaching expiry.

In accordance with one or more embodiments, the system for user-based licensing of service associated with device rentals may be utilized in connection with a secured location, as described above. One example of such a secured location is a hotel. For example, a given hotel may be a registered renter within the system (e.g., a renter recorded in the Renters Database 255 in the example system 200 shown in FIG. 2). The rooms offered by the hotel may have multiple IoT devices (e.g., coffee machines, desktop computers, air purification devices, etc.), which are associated with a fixed, secured location (e.g. a hotel room), and thus the devices may not have a way for a user (e.g., a hotel guest) to self-identify on them (e.g., the devices may not be equipped with a suitable fingerprint scanner). In such a scenario, when the hotel installs the various IoT devices in the rooms (or at some subsequent time), the hotel may use a portal associated with the system (e.g., Renters Portal 250) to record which secured locations (e.g., specific hotel rooms) are associated with which device IDs. In at least one embodiment, such data about the secured locations and associated device IDs may be stored in the Secured Locations Database 240.

In one implementation, a user may scan in their mobile device (e.g., smartphone) to register with a renter such as a hotel. Scanning their phone in this manner may allow the user to both check-in to the hotel and also allow the hotel to look up the user in the licensing system's director (e.g., Purchasers Directory Database 225). Where the user is not yet registered with the licensing system, the scanning action may allow a record of the user to be dynamically created and stored. Also, if the user purchased certain supplemental services in conjunction with renting the hotel room (e.g., air purification, premium television, etc.), appropriate service licenses may be created for that user for the duration of their stay.

Continuing with the example of a secured location, such as the hotel context, in accordance with an embodiment, when a user goes to use a particular IoT device in their hotel room (or at intermittent periods throughout the user's stay at the hotel), a look-up may be performed by the system. For example, in such a scenario, the IoT device may send its device ID to the system (e.g., to the Secured Locations Database 240) such that the specific location (e.g., Room No. 940) may be retrieved. The retrieved location may be used (e.g., sent), for example, with the Location Users Database 245 to determine a corresponding user ID associated with the location at that particular time. The user ID may then be used to determine one or more service licenses applicable to the services associated with the IoT device. The data associated with the licenses may be transmitted by the system to the IoT device so that the corresponding services in the hotel room may be activated (e.g., the air purification may start, etc.).

In accordance with one or more embodiments, at any point in time during the course of a device rental, the respective device rental agency may add additional services to the device rental or cancel existing services from the device rental, and the licenses locally stored on the device will reflect these changes the next time that the IoT device is connected to the Internet and performs a license check.

It should also be noted that, in some scenarios, a device rental agency may allow externally-purchased services to be used in connection with a device rental (e.g., a particular cable network service subscription may be used in connection with televisions located in a hotel room). In such instances, the device rental agency may arrange for some sort of revenue allocation between itself and the owner of the secured location. In at least some embodiments, a renter may configure an IoT device rental such that certain externally-purchased services are blocked or restricted from use in connection with the device (e.g., services that the renter does not offer for sale themselves). Information such as this (e.g., about blocked services, revenue splits, etc.) may be saved in a license restrictions database (not shown for purposes of brevity), which may, in at least some embodiments, be a component in the example system 200 shown in FIG. 2, or may be part of one or more of the other components included in the system 200. In such embodiments, at runtime, when an IoT device determines which services it should make available, the licensing system may utilize data contained in, for example, the Licensing Database 230, the Device Rental Database 235 (e.g., to determine which user rented the device), and also the license restriction database (e.g., to determine which, if any, externally-purchased licenses should not be considered or should be ignored). The IoT device may further communicate back to the system that a given service was used (e.g., so that the system can determine any revenue allocations that should be processed).

In accordance with one or more embodiments, a mapping may be created which maps a class of devices to a class of services which are compatible with it. In one example, such a mapping may be created by a manufacturer of a device, a provider of the licensing system, a renter, or by some other appropriate entity. For example, in an embodiment, determining available and compatible services associated with a device for which a rental has been requested by a user may proceed in the following example manner: device ID→ device class→ full list of services that are compatible with the device→ subset of services registered by service providers in the licensing system. One reason that such a mapping may be created is because even if, for example, a particular rental device (e.g., a bicycle) supports 200 services, if only a portion of the total service providers (e.g., 10 out of 18 service providers) have registered their services with the licensing system (e.g., giving 133 of the 200 supported services), then the actual list of services available for purchase by a user would be 133, not 200.

Figure 3:
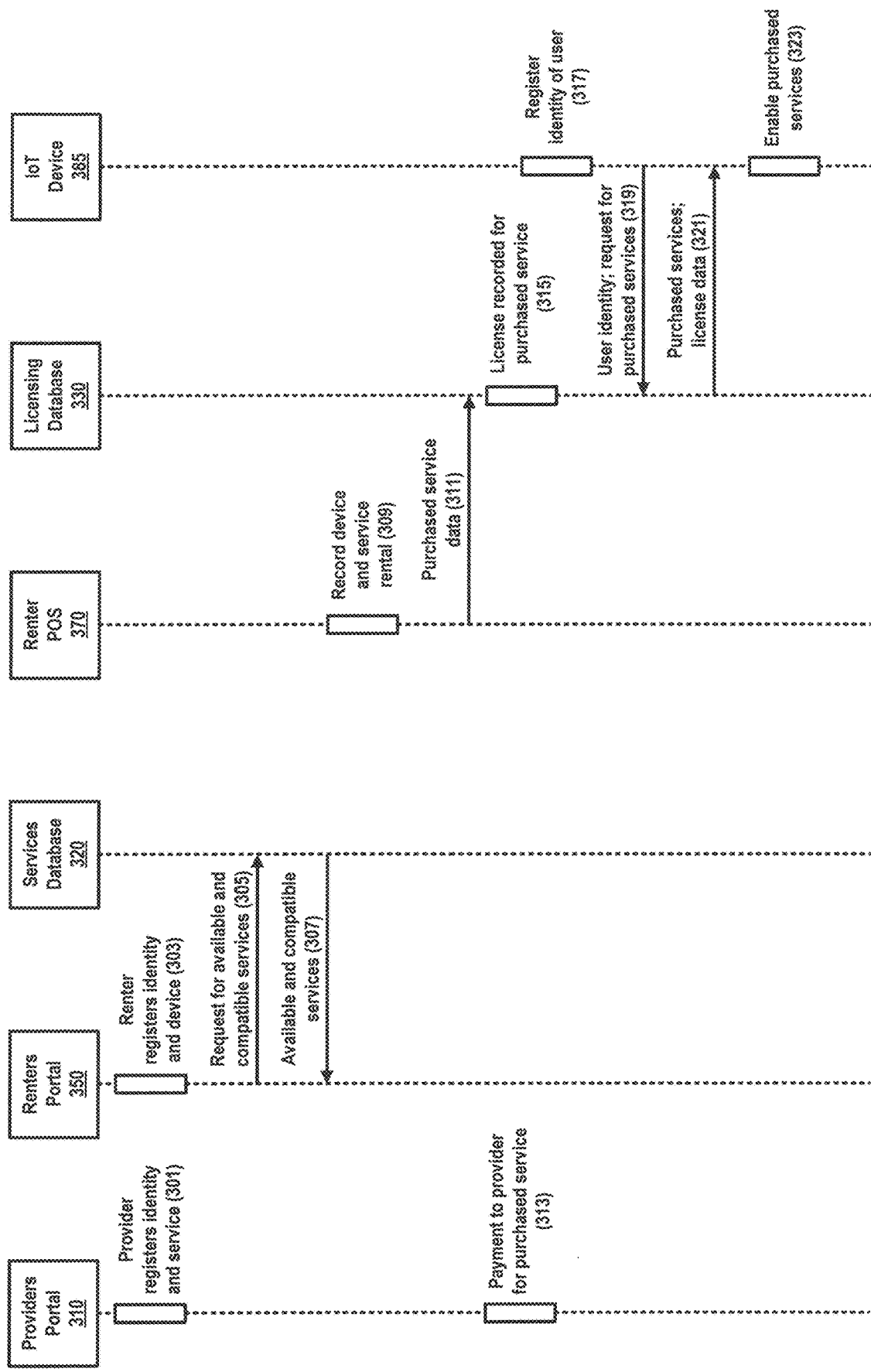
FIG. 3 is a block diagram illustrating example data flows and operations that may occur in a process for licensing services associated with device rentals, according to one or more embodiments described herein.

FIG. 3 illustrates example data flows and operations that may occur in a method for licensing services associated with device rentals, in accordance with one or more embodiments described herein. In at least one embodiment, the data flows and operations in the method for licensing services associated with device rentals may occur by and/or between a Providers Portal 310, a Renters Portal 350, a Services Database 320, a Renter POS Device or Portal (e.g., application) 370, a Licensing Database 330, and an IoT device 385 (e.g., network connectable device). It should be noted that one or more of Providers Portal 310, Renters Portal 350, Services Database 320, Renter POS Device or Portal 370, and Licensing Database 330 may have similar features and/or functionalities as Providers Portal 210, Renters Portal 250, Services Database 220, Renter POS Device or Portal 270, and Licensing Database 230, respectively, in the example licensing system 200 shown in FIG. 2 and described in detail above.

In some embodiments, the example process for licensing services associated with device rentals shown in FIG. 3 may include one or more other data flows and/or operations in addition to or instead of one or more of the example data flows and operations illustrated.

In at least one embodiment, a service provider may register (301) their identity and one or more services offered by the provider. A service provider may register their identity and one or more services offered by the service provider using, for example, a Providers Portal 310 (e.g., a web portal or website) associated with a licensing system. In at least one embodiment, the service provider's identity may be recorded (e.g., stored) in a database associated with the licensing system (e.g., Providers Database 215 in the example system 200 shown in FIG. 2). Similarly, in an embodiment, the one or more services registered by the service provider may also be submitted and recorded in a database associated with the licensing system (e.g., Services Database 220 of the example system 200).

A device rental agency (e.g., renter) may register (303) their identity and one or more devices (e.g., network connectable devices, such as IoT device 385) offered for rental by the renter. A renter may register their identity and one or more devices offered for rental by the renter using, for example, a Renters Portal 350 (e.g., a web portal or website) associated with the licensing system. In at least one embodiment, the renter's identity may be recorded (e.g., stored) in a database associated with the licensing system (e.g., Renters Database 255 in the example system 200 shown in FIG. 2). Similarly, in an embodiment, the one or more network connectable devices registered by the renter may also be recorded in a database associated with the licensing system (e.g., Devices Database 260 of the example system 200).

In an example scenario, a renter may engage with a user who is interested in purchasing a rental of one of the devices registered by the renter with the licensing system. In response to the user agreeing to rent one of the devices (e.g., purchasing a rental of the device from the renter), the Renters Portal 350 may send a request or query (305) to the licensing system for services that are available to rent and which are compatible with the particular device that will be rented by the user. In an embodiment, the request or query for available compatible services may be sent by the Renters Portal 350 to a Services Database 320. The Services Database 320, in response to receiving the request (303), may provide to the Renters Portal 350 an identification (e.g., a list) of the available compatible services (305) for the particular device that will be rented by the user.

In one example, the available compatible services (305) returned by the licensing system (e.g., by the Services Database 320 of the licensing system) may be presented by the renter to the user for possible purchase by the user in conjunction with the rental of the device. In at least one embodiment, if the user agrees to purchase a rental of one (or more) of the available and compatible services, the device rental and the service rental may be recorded (e.g., stored) (309) in a database of the licensing system. For example, if the user agrees to purchase a rental of one of the devices, the renter may utilize a point-of-sale application 370 to record (309) the device rental and the service rental.

In an embodiment, in response to the user purchasing the rental of the service, payment (e.g., which is made by the user for the purchase) may be made available (313) to the service provider who offered the service. For example, in an embodiment, funds may be provided to the service provider via the Providers Portal 310.

In accordance with one embodiment, data about the purchased (for rental) service may be sent (311) to Licensing Database 330, where a license may be recorded (313) for the purchased service.

Once the user receives the rented device 385 from the renter, and begins using the device 385, the user's identity may be registered with the device (317). In at least one embodiment, the user's identity (e.g., an identifier associated with the user) may be provided (319) to the Licensing Database 330 together with a request for services that the user has purchased. For example, the IoT device 385 may query the Licensing Database 330 for a list of services purchased by the user, as well as an indication of what level of license the user has purchased for the services (e.g., basic license, premium license, etc.). In response to querying the Licensing Database 330, the IoT device 385 may be provided with an identification or indication of the services purchased by the user, together with any license data associated with such purchased services (321). The purchased services may then be enabled (323) on the IoT device 385.

Figure 4:
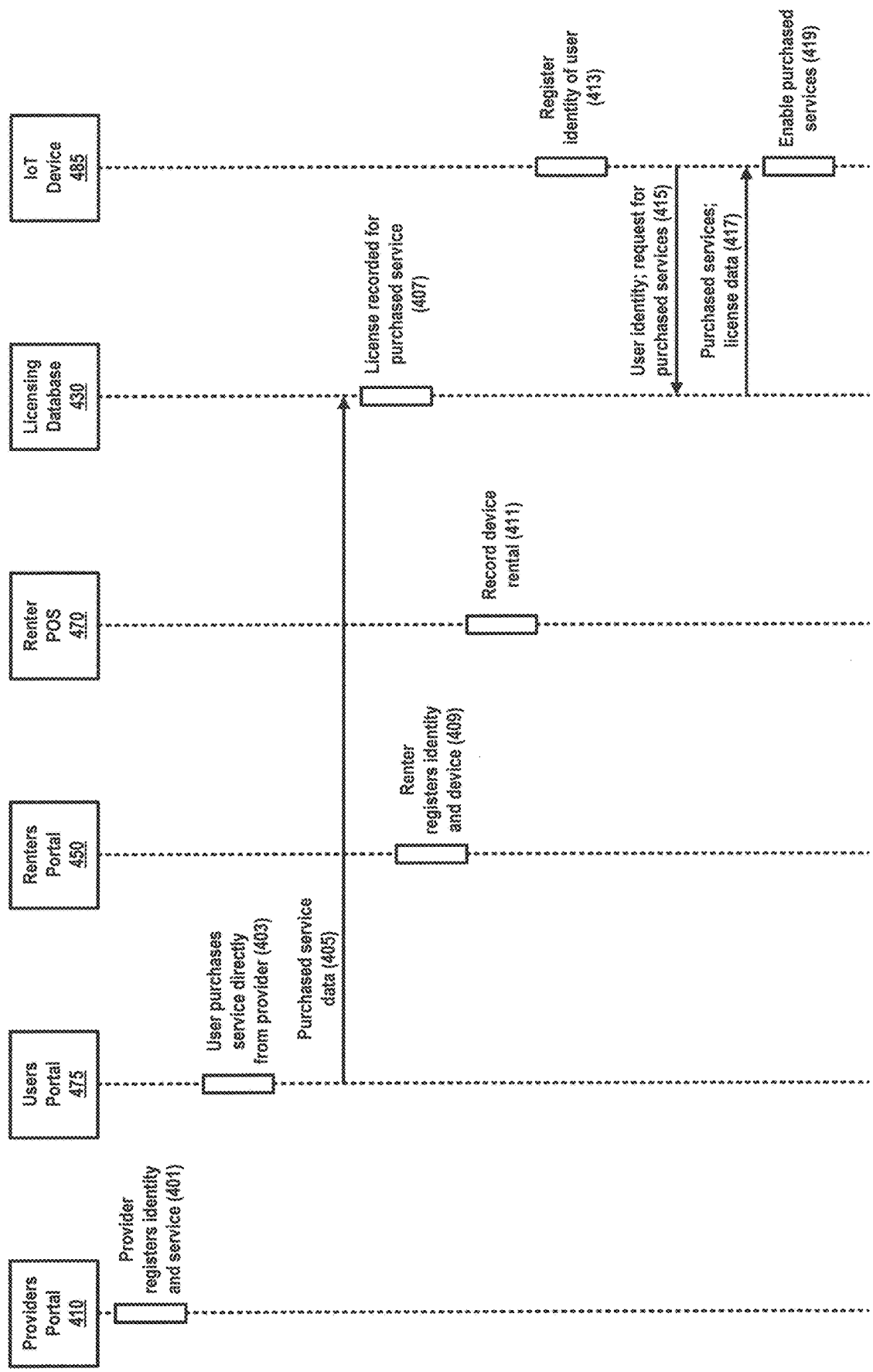
FIG. 4 is a block diagram illustrating example data flows and operations that may occur in a process for licensing services associated with device rentals, according to one or more embodiments described herein.

FIG. 4 illustrates example data flows and operations that may occur in a method for licensing services associated with device rentals, in accordance with one or more embodiments described herein. It should be noted that the example data flows and operations shown in FIG. 4 relate to a scenario in which the user purchases services directly from the service provider, rather than from the rental agency. In at least one embodiment, the data flows and operations in the method for licensing services associated with device rentals may occur by and/or between a Providers Portal 410, a Users Portal 475, a Renters Portal 450, a Renter POS Device or Portal (e.g., application) 470, a Licensing Database 430, and an IoT device 485 (e.g., network connectable device). It should be noted that one or more of Providers Portal 410, Users Portal 475, Renters Portal 450, Renter POS Device or Portal 470, and Licensing Database 430 may have similar features and/or functionalities as Providers Portal 210, Users Portal 275, Renters Portal 250, Renter POS Device or Portal 270, and Licensing Database 230, respectively, in the example licensing system 200 shown in FIG. 2 and described in detail above.

In some embodiments, the example process for licensing services associated with device rentals shown in FIG. 4 may include one or more other data flows and/or operations in addition to or instead of one or more of the example data flows and operations illustrated.

In at least one embodiment, a service provider may register (401) their identity and one or more services offered by the provider. A service provider may register their identity and one or more services offered by the service provider using, for example, a Providers Portal 410 (e.g., a web portal or website) associated with a licensing system. In at least one embodiment, the service provider's identity may be recorded (e.g., stored) in a database associated with the licensing system (e.g., Providers Database 215 in the example system 200 shown in FIG. 2). Similarly, in an embodiment, the one or more services registered by the service provider may also be recorded in a database associated with the licensing system (e.g., Services Database 220 of the example system 200).

In an embodiment, a user may utilize a Users Portal 475 to purchase (403) one or more services offered by the service provider directly from the service provider. In accordance with an embodiment, data about the purchased service(s) may be sent (405) to Licensing Database 430, where a license may be recorded (407) for the purchased service(s).

A device rental agency (e.g., renter) may register (409) their identity and one or more devices (e.g., network connectable devices, such as IoT device 485) offered for rental by the renter. A renter may register their identity and one or more devices offered for rental by the renter using, for example, a Renters Portal 450 (e.g., a web portal or website) associated with the licensing system. In at least one embodiment, the renter's identity may be recorded (e.g., stored) in a database associated with the licensing system (e.g., Renters Database 255 in the example system 200 shown in FIG. 2). Similarly, in an embodiment, the one or more network connectable devices registered by the renter may also be recorded in a database associated with the licensing system (e.g., Devices Database 260 of the example system 200).

In an example scenario, a renter may engage with a user who is interested in purchasing a rental of one of the devices registered by the renter with the licensing system. In an embodiment, the user is interested in purchasing only the rental of the device (e.g., and not any additional services associated with the device, which may have already been purchased by the user directly from the service provider (403)). In at least one embodiment, if the user agrees to purchase the device rental, the device rental may be recorded (e.g., stored) (411) in a database of the licensing system. For example, if the user agrees to purchase a rental of one of the devices, the renter may utilize a point-of-sale application 470 to record (411) the device rental.

Once the user receives the rented device 485 from the renter, and begins using the device 485, the user's identity may be registered (413) with the device 485. In at least one embodiment, the user's identity (e.g., an identifier associated with the user) may be provided (415) to the Licensing Database 430 together with a request for services that the user has purchased. For example, the IoT device 485 may query the Licensing Database 430 for a list of services purchased by the user, as well as an indication of what level of license the user has purchased for the services (e.g., basic license, premium license, etc.). In response to querying the Licensing Database 430, the IoT device 485 may be provided with an identification or indication of the services purchased by the user, together with any license data associated with such purchased services (417). The purchased services may then be enabled (419) on the IoT device 485.

Figure 5:
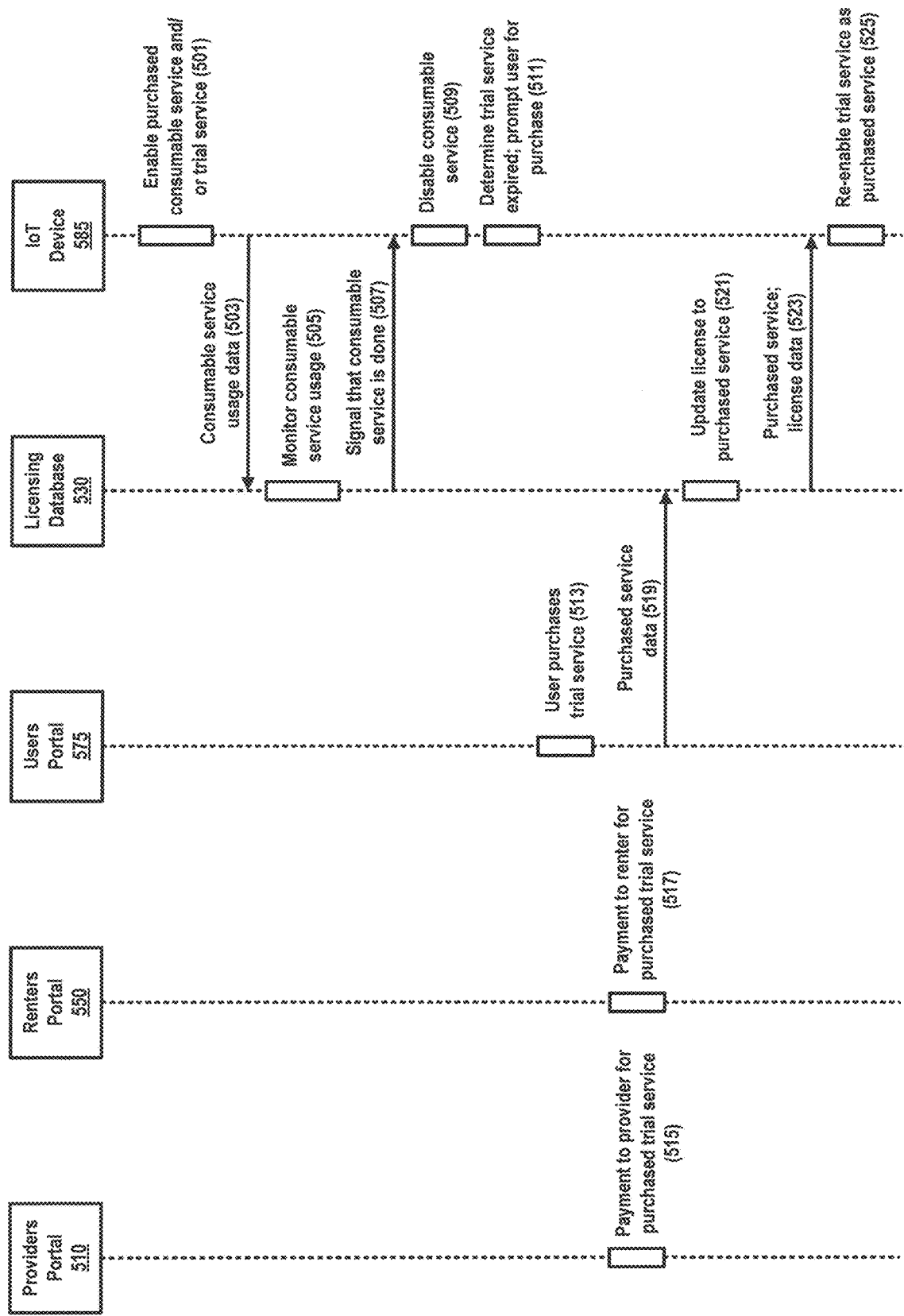
FIG. 5 is a block diagram illustrating example data flows and operations that may occur in a process for licensing services associated with device rentals, according to one or more embodiments described herein.

FIG. 5 illustrates example data flows and operations that may occur in a method for licensing services associated with device rentals, in accordance with one or more embodiments described herein. It should be noted that the example data flows and operations shown in FIG. 5 relate to a scenario in which the user purchases or is given a trial of one or more services for use with an IoT device rental. In at least one embodiment, the data flows and operations in the method for licensing services associated with device rentals may occur by and/or between a Providers Portal 510, a Users Portal 575, a Renters Portal 550, a Licensing Database 530, and an IoT device 585 (e.g., network connectable device). It should be noted that one or more of Providers Portal 510, Users Portal 575, Renters Portal 550, and Licensing Database 530 may have similar features and/or functionalities as Providers Portal 210, Users Portal 275, Renters Portal 250, and Licensing Database 230, respectively, in the example licensing system 200 shown in FIG. 2 and described in detail above.

In some embodiments, the example process for licensing services associated with device rentals shown in FIG. 5 may include one or more other data flows and/or operations in addition to or instead of one or more of the example data flows and operations illustrated. However, for purposes of brevity, such other data flows and/or operations have not been included in FIG. 5. For example, in an embodiment, the various data flows and/or operations associated with a service provider registering their identity and registering one or more services offered by the provider may be similar to the corresponding data flows and/or operations (e.g., (301)) shown in FIG. 3, or the corresponding data flows and/or operations (e.g., (401)) shown in FIG. 4, all of which are described in detail above. In an embodiment, the various data flows and/or operations associated with a device rental agency (e.g., renter) registering their identity and one or more devices (e.g., network connectable devices, such as IoT device 585) offered for rental by the renter may be similar to the corresponding data flows and/or operations (e.g., (303)) shown in FIG. 3, or the corresponding data flows and/or operations (e.g., (409)) shown in FIG. 4, all of which are described in detail above. It should be understood that one or more other data flows and/or operations corresponding to the various data flows and/or operations shown in FIG. 3 or 4 have not also been illustrated in FIG. 5 for purposes of brevity.

In some embodiments, one or more services associated with an IoT device is a "consumable" service. For example, as opposed to a "durable" service, where the service acquired or purchased by the user is permanent (e.g., is usable or accessible for the duration of the license), a "consumable" service is one that gets used up and then must be replaced or replenished (e.g., where there is a specific quantity or number of occurrences tied to the service). An example of a consumable service could be where a user purchases ten weather alerts, and after the tenth weather alert is received, the service ends or is no longer accessible by the user. For example, a user who has purchased the rental of an IoT device 585 (e.g., an IoT bicycle) may also purchase a weather alert service, where the weather alert service consists of two weather alerts.

In an embodiment, a user who has purchased the rental of an IoT device 585 (e.g., an IoT bicycle) may also receive a trial service associated with the IoT device 585. For example, a trial service may be a service that is enabled for a user to test out or try for a limited period of time before the service expires and is disabled. In an embodiment, the trial service may be offered to the user by the renter, for example, when the user purchases the device rental from the renter.

In an embodiment, a purchased consumable service and/or a trial service are enabled (501) on an IoT device 585 (e.g., a rented IoT device). Data about the user's usage of the consumable service (503) may be provided by the IoT device 585 to the Licensing Database 530. In some embodiments, the IoT device 585 may periodically transmit such consumable service usage data (503) to the Licensing Database 530. In an embodiment, the IoT device 585 may transmit such consumable service usage data (503) to the Licensing Database 530 in response to a request for such data (e.g., from the licensing system). The Licensing Database 530 may use the consumable service usage data (503) to monitor (505) the consumable service usage by the user.

In an embodiment, when the consumable service has been fully used up by the user, the Licensing Database 530 may send an indication (e.g., signal) that the consumable service is done (507) to the IoT device 585. Upon receiving the signal (507) that the consumable service has been fully consumed, the IoT device 585 may disable (509) the service on the device.

In an embodiment, the signal (507) from the Licensing Database 530 may include data that is used by the IoT device 585 to determine that the trial service enabled on the device 585 has expired (511). In at least some embodiments, when the IoT device 585 determines that the trial service has expired, the IoT device 585 may also prompt (511) the user to purchase the service that the user had been using during the trial period. The user may purchase the (expired) trial service (513) using the Users Portal, in an embodiment.

In an embodiment, in response to the user purchasing the trial service (513), payment (e.g., which is provided by the user for the purchase of the expired trial service) may be made available (515) to the service provider of the service. In some embodiments, depending on any arrangement or agreement between the service provider and the renter, in response to the user purchasing the trial service (513), payment may also be made available to the renter (517) who offered the trial service to the user at the time the user purchased the device rental from the renter. For example, in an embodiment, funds may be provided to the service provider via the Providers Portal 510 and may be provided to the renter via the Renters Portal 550.

In accordance with an embodiment, data about the purchased trial service may be sent (519) to Licensing Database 530, where the license for the trial service may be updated (521) to reflect the purchased service. The IoT device 585 may be provided with an identification or indication of the trial service purchased by the user, together with any license data associated with such purchased trial service (523). The trial service may then be re-enabled (525) on the IoT device 585 as a purchased service.

Figure 6:
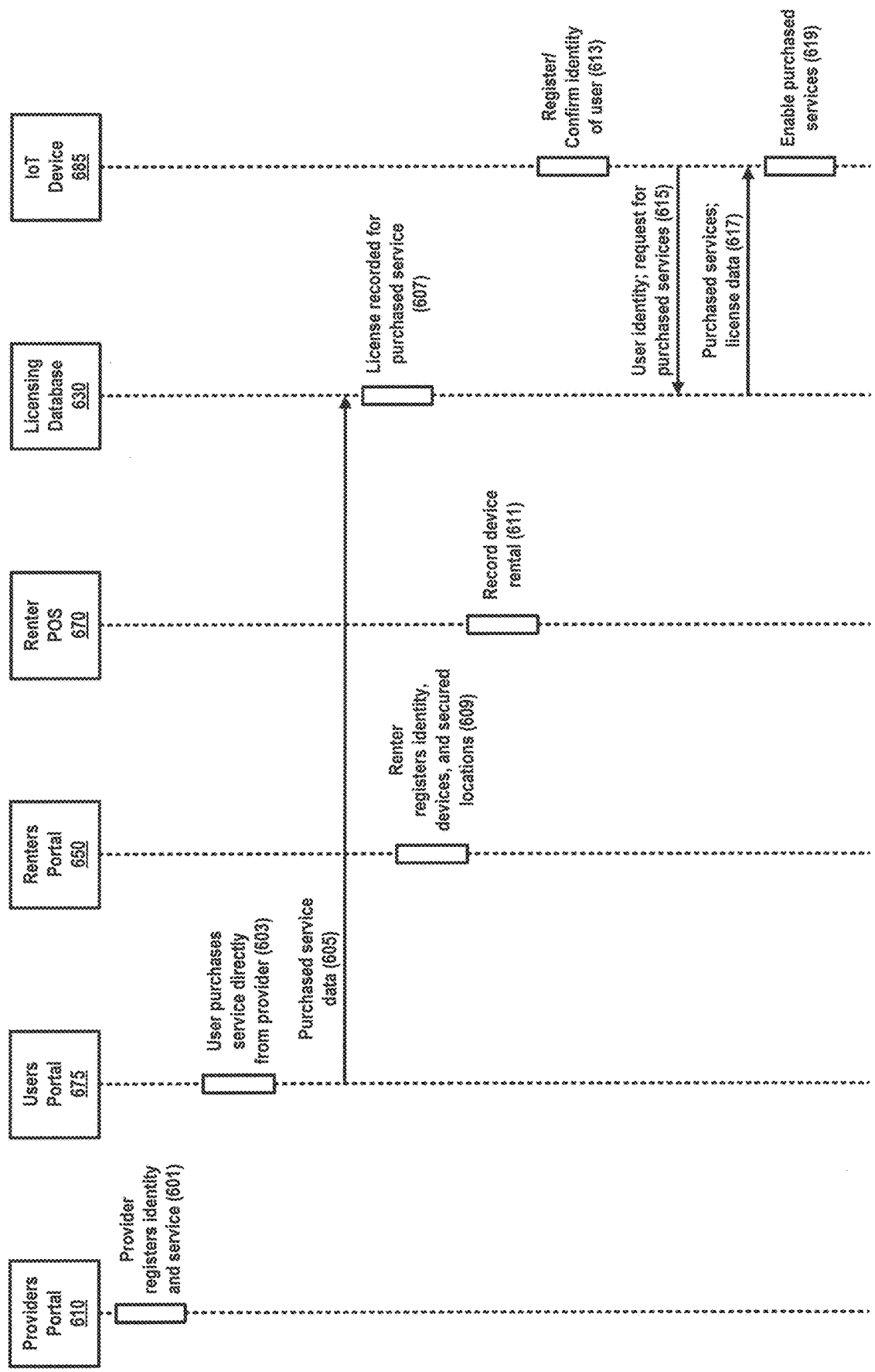
FIG. 6 is a block diagram illustrating example data flows and operations that may occur in a process for licensing services associated with device rentals, according to one or more embodiments described herein.

FIG. 6 illustrates example data flows and operations that may occur in a method for licensing services associated with device rentals, in accordance with one or more embodiments described herein. The example data flows and operations shown in FIG. 6 relate to a scenario in which the renter is an owner or operator of a fixed, secured location, where the secured location includes multiple IoT devices, as described above. In at least one embodiment, the data flows and operations in the method for licensing services associated with device rentals may occur by and/or between a Providers Portal 610, a Users Portal 675, a Renters Portal 650, a Renter POS Device or Portal (e.g., application) 670, a Licensing Database 630, and an IoT device 685 (e.g., network connectable device). It should be noted that one or more of Providers Portal 610, Users Portal 675, Renters Portal 650, Renter POS Device or Portal 670, and Licensing Database 630 may have similar features and/or functionalities as Providers Portal 210, Users Portal 275, Renters Portal 250, Renter POS Device or Portal 270, and Licensing Database 230, respectively, in the example licensing system 200 shown in FIG. 2 and described in detail above.

In some embodiments, the example process for licensing services associated with device rentals shown in FIG. 6 may include one or more other data flows and/or operations in addition to or instead of one or more of the example data flows and operations illustrated. However, for purposes of brevity, such other data flows and/or operations have not been included in FIG. 6.

In at least one embodiment, a service provider may register (601) their identity and one or more services offered by the provider. A service provider may register their identity and one or more services offered by the service provider using, for example, a Providers Portal 610 (e.g., a web portal or website) associated with a licensing system. In at least one embodiment, the service provider's identity may be recorded (e.g., stored) in a database associated with the licensing system (e.g., Providers Database 215 in the example system 200 shown in FIG. 2). Similarly, in an embodiment, the one or more services registered by the service provider may also be recorded in a database associated with the licensing system (e.g., Services Database 220 of the example system 200).

In an embodiment, a user may utilize a Users Portal 675 to purchase (603) one or more services offered by the service provider directly from the service provider. In accordance with an embodiment, data about the purchased service(s) may be sent (605) to Licensing Database 630, where a license may be recorded (607) for the purchased service(s).

In some embodiments, a renter may be an owner or operator of a secured location (e.g., a hotel). In such an embodiment, the renter may register (609) their identity, one or more devices (e.g., network connectable devices, such as IoT device 685) offered for rental by the renter (e.g., in conjunction with the rental of a hotel room), and also register the secured locations associated with the registered devices. The renter may register their identity, the one or more devices offered for rental by the renter, and the secured locations associated with the devices, using, for example, a Renters Portal 650 (e.g., a web portal or website) associated with the licensing system. In at least one embodiment, the renter's identity may be recorded (e.g., stored) in a database associated with the licensing system (e.g., Renters Database 255 in the example system 200 shown in FIG. 2). Similarly, in an embodiment, the one or more network connectable devices registered by the renter may also be recorded in a database associated with the licensing system (e.g., Devices Database 260 of the example system 200). In an embodiment, the secured locations registered by the renter may be recorded in a data associated with the licensing system (e.g., Secured Locations Database 240 of the example system 200).

For example, a user may rent a hotel room (secured location) from the renter for a period of time, and register (e.g., check-in) at the front desk of the hotel. In an embodiment, the renter may record one or more device rentals (611) associated with the rental of the secured location. For example, at the time of check-in to the hotel, the renter may utilize a point-of-sale application 670 to record (611) the rental of the one or more devices associated with the secured location.

In an embodiment, when the user enters the secured location, the user's identity may be registered/confirmed (613) (e.g., by use of the key card to access the secured location). In another embodiment, the user's identity may be registered or confirmed (613) when the user activates one of the IoT devices 685 available in the secured location. In at least one embodiment, the user's identity (e.g., an identifier associated with the user) may be provided (615) to the Licensing Database 630 together with a request for services that the user has purchased. For example, one of the IoT devices 685 available in the secured location, which may be the IoT device activated by the user, may query the Licensing Database 630 for a list of services purchased by the user, as well as an indication of what level of license the user has purchased for the services (e.g., basic license, premium license, etc.). In response to querying the Licensing Database 630, the IoT device 685 may be provided with an identification or indication of the services purchased by the user, together with any license data associated with such purchased services (617). The purchased services may then be enabled (619) on the IoT devices 685 available at the secured location.

In an embodiment, when a user enters a secured location (e.g., a hotel room), the user's identity is confirmed (e.g., via the key card used to access the secured location). Upon confirmation of the user's identity, a first IoT device at the secured location may query the licensing system for which services to enable on the first IoT device. The licensing system ascertains the user's identity as being the registered user for that secured location for the given time period. In an embodiment, the licensing system may further determine (e.g., based on data stored in Licensing Database 630) that the user has purchased licenses for two services. The licensing system may then determine that the first IoT device at the secured location is compatible with the second of the two services purchased by the user. Details about the license for the second purchased service may be provided to the first IoT device, and the first IoT device may then enable the second purchased service on the device. Similarly, a second IoT device at the secured location may query the licensing system for which services to enable on the second IoT device. The licensing system may determine the user's identity as being the registered user for that secured location for the given time period. In an embodiment, the licensing system may further determine (e.g., based on data stored in Licensing Database 630) that the user has purchased licenses for two services and that the second IoT device at the secured location is compatible with the first of the two services purchased by the user. Details about the license for the first purchased service may be provided to the second IoT device, and the second IoT device may then enable the first purchased service on the device.

Figure 7:
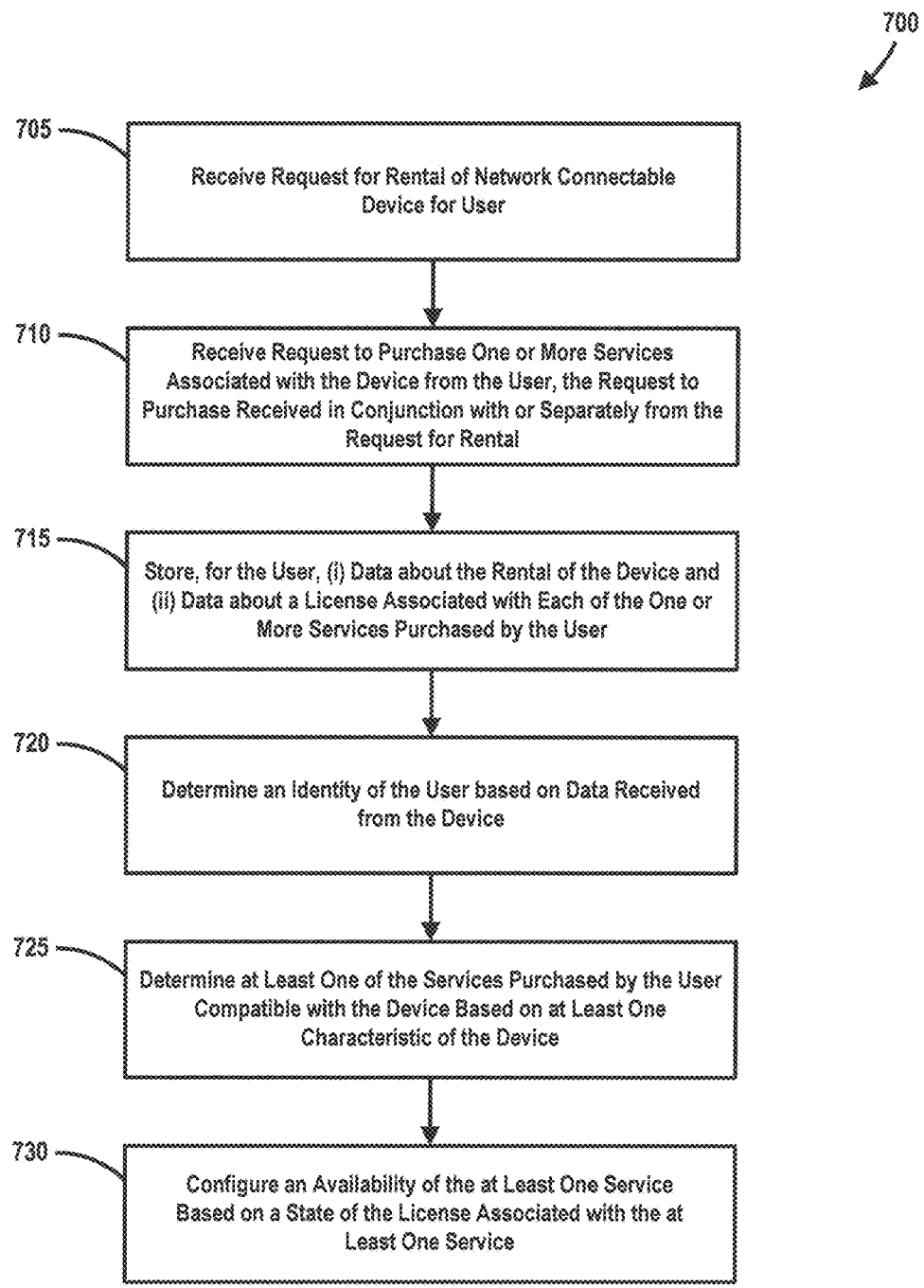
FIG. 7 is a flowchart illustrating an example process for licensing services associated with device rentals, according to one or more embodiments described herein.

FIG. 7 illustrates an example method 700 for licensing services associated with device rentals, in accordance with one or more embodiments described herein. For example, in at least one embodiment, the method 700 may be performed by the example user-based licensing system 200 shown in FIG. 2 and described in detail above. It should be understood that while one or more components of the example system 200 may be referenced in the following description of the example method 700 for licensing services associated with device rentals, one or more operations of the method 700 may be performed by one or more other components of the system 200 not referenced below.

At block 705, a request for a rental of a network connectable device (e.g., an IoT device) may be received for the user. In at least one embodiment, the request for rental that may be received at block 705 may be from a portal (e.g., website or web portal) associated with a licensing system (e.g., Renters Portal 250 in the example system 200 shown in FIG. 2). The request that may be received at block 705 may be in any of a variety of suitable forms.

At block 710, a request may be made by the user, where the request is to purchase one or more services associated with the device for which a request for rental was received at block 705. In one embodiment, the request to purchase one or more services associated with the device at block 710 may be received in conjunction with the request for rental of the device received at block 705. In another embodiment, the request to purchase one or more services associated with the device at block 710 may be received separately from the request for rental of the device received at block 705. For example, the request to purchase one or more services associated with the device may be received subsequent to the request for rental of the device.

At block 715, data about the rental of the device and data about a license associated with each of the one or more services purchased by the user may be stored for the user. For example, in an embodiment, the data about the rental of the device may be stored in a device rental database of the licensing system (e.g., Device Rental Database 235 of the example system 200 shown in FIG. 2). In an embodiment, the data about the license associated with each of the one or more services purchased by the user may be stored, for example, in a licensing database of the licensing system (e.g., Licensing Database 230).

At block 720, an identity of the user may be determined. For example, in at least one embodiment, an identity of the user may be determined at block 720 based on data received from the device rented by the user. Such data may include, for example, a fingerprint signature of the user, an identifier associated with a personal device of the user (e.g., a mobile phone or person computer), and the like.

At block 725, a determination may be made of at least one service, of the one or more services purchased by the user (in the request at block 710), compatible with the device for which a rental was requested at block 705. For example, in an embodiment, the at least one service may be determined at block 725 based on at least one characteristic of the device. For example, the at least one service determined at block 725 may be based on a capability or functionality of the device, a particular version of the device, a make or model of the device, or the like, or any combination thereof.

At block 730, an availability of the at least one service (determined at block 725) may be configured on the device based on a state of the license associated with the at least one service. In accordance with at least one embodiment, different levels of availability of the service may be configured on the device. For example, if the state of the license associated with the service indicates that the license is expired, then the availability of the service on the device may be removed or restricted. In another example, the availability of the service on the device may be configured in one or more other ways or according to one or more other levels based on a different state of the license for the service.

Figure 8:
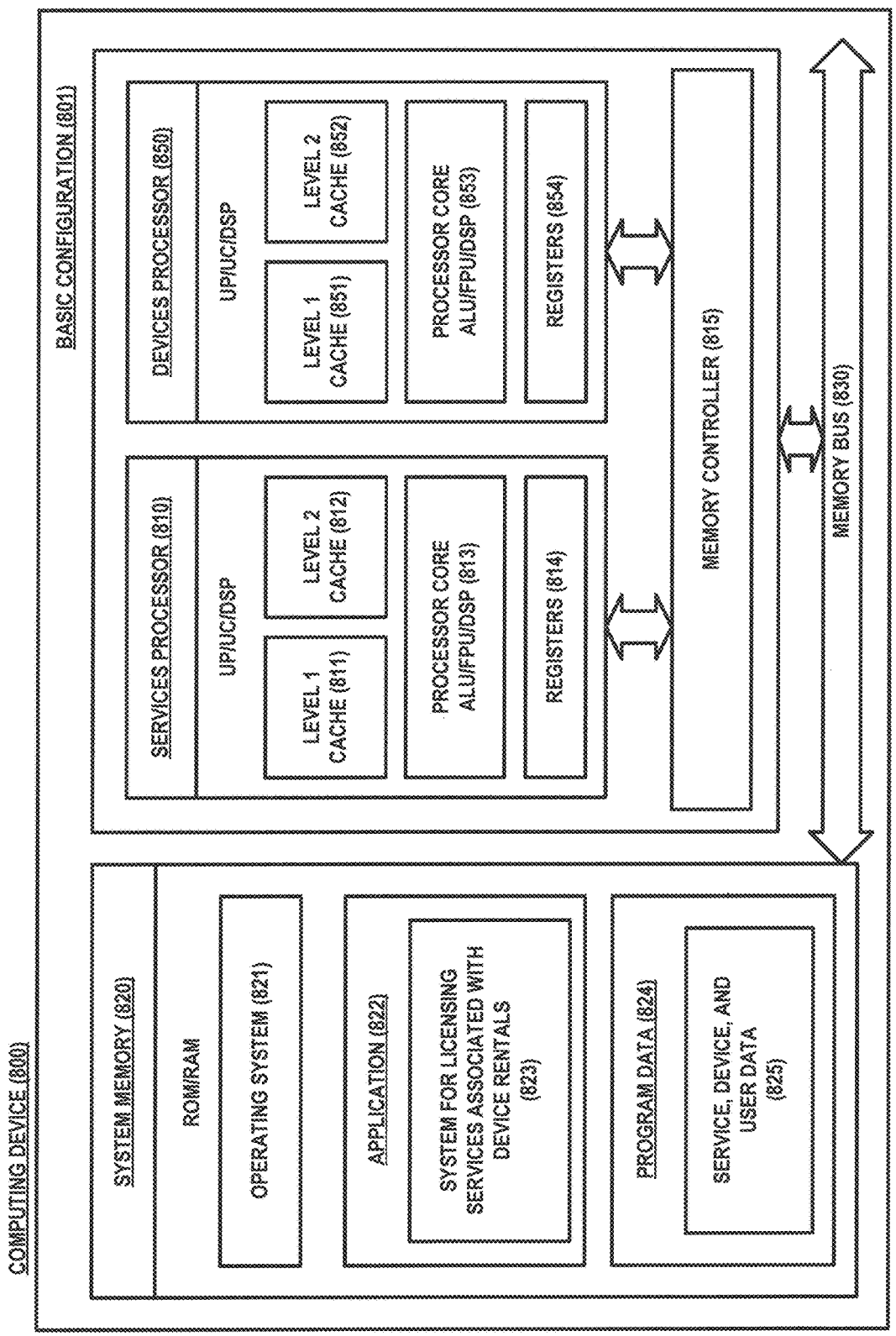
FIG. 8 is a block diagram illustrating an example computing device arranged for licensing services associated with device rentals, according to one or more embodiments described herein.

FIG. 8 is a high-level block diagram of an exemplary computing device (800) that is arranged for selecting an optimal cloud configuration for an application based on adaptive performance model generated for the application, in accordance with one or more embodiments described herein. For example, in accordance with at least one embodiment of the present disclosure, the computing device (800) may be configured to adaptively and automatically build a performance model for a given application, and utilize the performance model to determine an optimal cloud configuration from a group of candidate cloud configurations. In a basic configuration (801), the computing device (800) typically includes one or more processors (810, 850) and system memory (820). A memory bus (830) can be used for communicating between the one or more processors (810, 850) and the system memory (820).

Depending on the desired configuration; the one or more processors (810, 850) can be of any type including but not limited to a microprocessor (μP), a microcontroller (μC), a digital signal processor (DSP), or the like, or any combination thereof. For example, in accordance with at least one embodiment, one processor may be a Services Processor (810) while another processor is a dedicated Devices Processor (850). In such a configuration, the dedicated Devices Processor (850) may operate continuously to perform, for example, interface operations and communications between the computing device (800) and one or more IoT devices (e.g., one or more of IoT devices 130 in the example environment shown in FIG. 1), or between the computing device (800) and one or more of the databases of the system for licensing services associated with device rentals (e.g., Devices Database 260 and/or Device Rental Database 235 in the example system 200 shown in FIG. 2). Either or both of the processors (810, 850) can include one more levels of caching, such as a level one cache (811, 851) and a level two cache (812, 852), a processor core (813, 853), and registers (814, 854). The processor core (813, 853) can include an arithmetic logic unit (ALU), a floating point unit (FPU), a digital signal processing core (DSP Core), or the like, or any combination thereof. A memory controller (815) can also be used with the one or more processors (810, 850), or in some implementations separate memory controllers (815) can be an internal part of each of the one or more processors (810, 850).

Depending on the desired configuration, the system memory (820) can be of any type including but not limited to volatile memory (such as RAM), non-volatile memory (such as ROM, flash memory, etc.) or any combination thereof. System memory (820) typically includes an operating system (821), one or more applications (822), and program data (824). The application (822) may include a system for licensing services associated with device rentals (823). In accordance with at least one embodiment of the present disclosure, the system for licensing services associated with device rentals (523) is designed to connect services, users, and IoT devices with respect to licensing based on, for example, the particular context in which a device is being rented, one or more capabilities of the device being rented, availability of services for the particular device, and/or one or more characteristics of the user who is renting the device. In accordance with at least one embodiment, the user-based licensing system (823) is capable of enabling a user who is renting a device to purchase one or more services associated with the device in conjunction with rental.

Program Data (824) may include storing instructions that, when executed by the one or more processing devices, implement a system (823) and method for user-based licensing of services associated with device rentals. Additionally, in accordance with at least one embodiment, program data (824) may include service, device, and user data (825), which may relate to, for example, various IoT device rentals, services associated with those devices, and users who rent the devices and purchase one or more of the associated services. In accordance with at least some embodiments, the application (822) can be arranged to operate with program data (824) on an operating system (821).

The computing device (800) can have additional features or functionality, and additional interfaces to facilitate communications between the basic configuration (801) and any required devices and interfaces.

System memory (820) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of the device (800).

The computing device (800) may be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that includes any of the above functions. In addition, the computing device (800) may also be implemented as a personal computer including both laptop computer and non-laptop computer configurations, one or more servers, Internet-of-Things systems, and the like.

In an embodiment, a computer-implemented method for licensing services associated with a network-connectable device is provided, the method comprising: receiving a request for rental of a network-connectable device for a user; receiving, from the user, a request to purchase one or more services associated with the device, wherein the request to purchase one or more services is received in conjunction with the request for rental of the device or separately from the request for rental of the device; storing, for the user, (i) data about the rental of the device, (ii) data about a license associated with each of the one or more services purchased by the user, and (iii) data about an identity of the user; determining an identity of the user based on data received from the device; determining at least one compatible service, of the one or more services purchased by the user, wherein the at least one compatible service is determined based on at least one characteristic of the device; and configuring an availability of the at least one compatible service on the device based on a state of the license associated with the at least one compatible service.

In some embodiments, the request to purchase one or more services associated with the device is received subsequent to receiving the request for rental of the device.

In some embodiments, determining at least one compatible service, of the one or more services purchased by the user, includes: obtaining a device identifier associated with the device; using the device identifier to determine one or more services associated with the device; and determining the at least one compatible service, of the one or more services associated with the device, based on the at least one characteristic of the device.

In some embodiments, obtaining the device identifier includes scanning an identification tag located on the device.

In some embodiments, determining an identity of the user includes: receiving a unique identifier associated with the user; and matching the received unique identifier to a unique identifier stored in a directory database.

In some embodiments, determining an identity of the user includes: detecting, by a sensing component of the device, a fingerprint signature of the user; and determining a user identification mapped to the fingerprint signature of the user in a directory database.

In some embodiments, determining an identity of the user includes: receiving, at the device to be rented by the user, via a short-range communication channel, a unique identifier associated with the user from a mobile device operated by the user; and determining, by the device to be rented by the user, a user identification mapped to the unique identifier in a directory database.

In one or more embodiments, the short-range communication channel is a near-field communication channel or a Bluetooth communication channel.

In some embodiments, the license for the purchased service includes data about one or more of: a duration of the license; a start time for the license; an end time for the license; and an identifier of the purchased service.

In one or more embodiments, the network-connectable device belongs to a class of network-connectable devices, and the computer-implemented method for licensing services further comprises: creating a mapping of the class of network-connectable devices to a class of services compatible with the class of devices; and storing the mapping in (i) a database associated with at least one provider of the class of services or (ii) a database associated with the class of devices.

In some embodiments, the one or more services purchased by the user belong to a subset of the class of services registered with a licensing system.

In one or more embodiments, the class of services registered with the licensing system is registered using a web portal associated with at least one provider of the class of services.

In some embodiments, determining at least one compatible service, of the one or more services purchased by the user, includes determining at least one service, of the subset of the class of services registered with the licensing system, compatible with the device based on (i) a device identifier associated with the device and (ii) the mapping of the class of network-connectable devices to the class of services compatible with the class of devices.

In one or more embodiments, (i) the request for rental of the network-connectable device and (ii) the request to purchase one or more services associated with the device are received at a web portal associated with a renter of the device.

In an embodiment, the request for rental of the network-connectable device is received at a web portal associated with a renter of the device, and the request to purchase one or more services associated with the device is received at a web portal associated with at least one provider of the one or more services.

In some embodiments, the network-connectable device is one of a plurality of network-connectable devices associated with a fixed location.

In some embodiments, the request for rental of the network-connectable device is included in a request for rental of the fixed location; and the request to purchase one or more services associated with the device is received in conjunction with the with the request for rental of the fixed location or separately from the request for rental of the fixed location.

In an embodiment, the identity of the user is determined based on data received from any of the plurality of network-connectable devices associated with the fixed location.

In one or more embodiments, the state of the license associated with the at least one service is based on a duration of the rental of the fixed location.

In one or more embodiments, the availability of the at least one service on the device is configured in response to the user activating the device at the fixed location.

In an embodiment of the present disclosure, a system for licensing services associated with a network-connectable device is provided, where the system comprises one or more processors; and a non-transitory computer-readable medium coupled to the one or more processors having instructions stored thereon that, when executed by the one or more processors, cause the one or more processors to perform operations comprising: receiving a request for rental of a network-connectable device for a user; receiving a request from a user to purchase one or more services associated with the device, wherein the request to purchase one or more services is received in conjunction with the request for rental of the device or separately from the request for rental of the device; storing, for the user, (i) data about the rental of the device, (ii) data about a license associated with each of the one or more services purchased by the user, and (iii) data about an identity of the user; determining an identity of the user based on data received from the device; determining at least one compatible service, of the one or more services purchased by the user, wherein the at least one compatible service is determined based on at least one characteristic of the device; and configuring an availability of the at least one compatible service on the device based on a state of the license associated with the at least one compatible service.

In some embodiments, the request to purchase one or more services associated with the device is received subsequent to receiving the request for rental of the device.

In some embodiments, the one or more processors of the system for licensing services associated with a network-connectable device are caused to perform further operations comprising: obtaining a device identifier associated with the device; using the device identifier to determine one or more services associated with the device; and determining the at least one compatible service, of the one or more services associated with the device, based on the at least one characteristic of the device.

In some embodiments, the one or more processors of the system for licensing services associated with a network-connectable device are caused to perform further operations comprising: obtaining the device identifier associated with the device based on a scan of an identification tag located on the device.

In some embodiments, the one or more processors of the system for licensing services associated with a network-connectable device are caused to perform further operations comprising: receiving a unique identifier associated with the user; and matching the received unique identifier to a unique identifier stored in a directory database.

In some embodiments, the one or more processors of the system for licensing services associated with a network-connectable device are caused to perform further operations comprising: receiving data associated with a fingerprint signature of the user, the fingerprint signature of the user being detected by a sensing component of the device; and determining a user identification mapped to the fingerprint signature of the user in a directory database.

In some embodiments, the license for the purchased service includes data about one or more of: a duration of the license; a start time for the license; an end time for the license; and an identifier of the purchased service.

In some embodiments, the network-connectable device belongs to a class of network-connectable devices, and the one or more processors of the system for licensing services associated with a network-connectable device are caused to perform further operations comprising: creating a mapping of the class of network-connectable devices to a class of services compatible with the class of devices; and storing the mapping in (i) a database associated with at least one provider of the class of services or (ii) a database associated with the class of devices.

In some embodiments, the one or more services purchased by the user belong to a subset of the class of services registered with a licensing system.

In some embodiments, the class of services registered with the licensing system is registered using a web portal associated with at least one provider of the class of services.

In some embodiments, the one or more processors of the system for licensing services associated with a network-connectable device are caused to perform further operations comprising determining at least one service, of the subset of the class of services registered with the licensing system, compatible with the device based on (i) a device identifier associated with the device and (ii) the mapping of the class of network-connectable devices to the class of services compatible with the class of devices.

In some embodiments, the one or more processors of the system for licensing services associated with a network-connectable device are caused to perform further operations comprising receiving (i) the request for rental of the network-connectable device and (ii) the request to purchase one or more services associated with the device from a web portal associated with a renter of the device.

In some embodiments, the one or more processors of the system for licensing services associated with a network-connectable device are caused to perform further operations comprising: receiving the request for rental of the network-connectable device from a web portal associated with a renter of the device, and receiving the request to purchase one or more services associated with the device from a web portal associated with at least one provider of the one or more services.

In some embodiments, the network-connectable device is one of a plurality of network-connectable devices associated with a fixed location.

In some embodiments, the request for rental of the network-connectable device is included in a request for rental of the fixed location; and the request to purchase one or more services associated with the device is received in conjunction with the with the request for rental of the fixed location or separately from the request for rental of the fixed location.

In some embodiments, the one or more processors of the system for licensing services associated with a network-connectable device are caused to perform further operations comprising determining the identity of the user based on data received from any of the plurality of network-connectable devices associated with the fixed location.

In some embodiments, the state of the license associated with the at least one service is based on a duration of the rental of the fixed location.

In some embodiments, the one or more processors of the system for licensing services associated with a network-connectable device are caused to perform further operations comprising: receiving an indication that the user activated the device at the fixed location; and configuring the availability of the at least one service on the device based on the received indication.

In some embodiments, the one or more processors of the system for licensing services associated with a network-connectable device are caused to perform further operations comprising: providing a web portal for renters of network-connectable devices to register the network-connectable devices with the system for licensing; or providing a web portal for providers of services associated with network-connectable devices to register the services with the system for licensing; or providing a web portal for users to register with the system for licensing.

In some embodiments, the one or more processors of the system for licensing services associated with a network-connectable device are caused to perform further operations comprising: providing a web portal for renters of network-connectable devices to register the network-connectable devices with the system for licensing; providing a web portal for providers of services associated with network-connectable devices to register the services with the system for licensing; and providing a web portal for users to register with the system for licensing.

Yet another embodiment of the present disclosure relates to a tangible, non-transitory computer readable medium, or media, storing machine readable instructions that, when executed by one or more processors, cause the one or more processors to perform operations comprising: receiving a request for rental of a network-connectable device for a user; receiving a request from a user to purchase one or more services associated with the device, wherein the request to purchase one or more services is received in conjunction with the request for rental of the device or separately from the request for rental of the device; storing, for the user, (i) data about the rental of the device, (ii) data about a license associated with each of the one or more services purchased by the user, and (iii) data about an identity of the user; determining an identity of the user based on data received from the device; determining at least one service, of the one or more services purchased by the user, compatible with the device, wherein the at least one service is determined based on at least one characteristic of the device; and configuring an availability of the at least one service on the device based on a state of the license associated with the at least one service.

In some embodiments, the request to purchase one or more services associated with the device is received subsequent to receiving the request for rental of the device.

In some embodiments, the machine readable instructions stored on the non-transitory computer-readable medium or media, when executed by the one or more processors, cause the one or more processors to perform further operations comprising: obtaining a device identifier associated with the device; using the device identifier to determine one or more services associated with the device; and determining the at least one service compatible with the device, of the one or more services associated with the device, based on the at least one characteristic of the device.

In some embodiments, the machine readable instructions stored on the non-transitory computer-readable medium or media, when executed by the one or more processors, cause the one or more processors to perform further operations comprising: obtaining the device identifier associated with the device based on a scan of an identification tag located on the device.

In some embodiments, the machine readable instructions stored on the non-transitory computer-readable medium or media, when executed by the one or more processors, cause the one or more processors to perform further operations comprising: receiving a unique identifier associated with the user; and matching the received unique identifier to a unique identifier stored in a directory database.

In some embodiments, the machine readable instructions stored on the non-transitory computer-readable medium or media, when executed by the one or more processors, cause the one or more processors to perform further operations comprising: receiving data associated with a fingerprint signature of the user, the fingerprint signature of the user being detected by a sensing component of the device; and determining a user identification mapped to the fingerprint signature of the user in a directory database.

In some embodiments, the license for the purchased service includes data about one or more of: a duration of the license; a start time for the license; an end time for the license; and an identifier of the purchased service.

In some embodiments, the network-connectable device belongs to a class of network-connectable devices, and the machine readable instructions stored on the non-transitory computer-readable medium or media, when executed by the one or more processors, cause the one or more processors to perform further operations comprising: creating a mapping of the class of network-connectable devices to a class of services compatible with the class of devices; and storing the mapping in (i) a database associated with at least one provider of the class of services or (ii) a database associated with the class of devices.

In some embodiments, the one or more services purchased by the user belong to a subset of the class of services registered with a licensing system.

In some embodiments, the class of services registered with the licensing system is registered using a web portal associated with at least one provider of the class of services.

In some embodiments, the machine readable instructions stored on the non-transitory computer-readable medium or media, when executed by the one or more processors, cause the one or more processors to perform further operations comprising determining at least one service, of the subset of the class of services registered with the licensing system, compatible with the device based on (i) a device identifier associated with the device and (ii) the mapping of the class of network-connectable devices to the class of services compatible with the class of devices.

In some embodiments, the machine readable instructions stored on the non-transitory computer-readable medium or media, when executed by the one or more processors, cause the one or more processors to perform further operations comprising receiving (i) the request for rental of the network-connectable device and (ii) the request to purchase one or more services associated with the device from a web portal associated with a renter of the device.

In some embodiments, the machine readable instructions stored on the non-transitory computer-readable medium or media, when executed by the one or more processors, cause the one or more processors to perform further operations comprising: receiving the request for rental of the network-connectable device from a web portal associated with a renter of the device, and receiving the request to purchase one or more services associated with the device from a web portal associated with at least one provider of the one or more services.

In some embodiments, the network-connectable device is one of a plurality of network-connectable devices associated with a fixed location.

In some embodiments, the request for rental of the network-connectable device is included in a request for rental of the fixed location; and the request to purchase one or more services associated with the device is received in conjunction with the with the request for rental of the fixed location or separately from the request for rental of the fixed location.

In some embodiments, the machine readable instructions stored on the non-transitory computer-readable medium or media, when executed by the one or more processors, cause the one or more processors to perform further operations comprising determining the identity of the user based on data received from any of the plurality of network-connectable devices associated with the fixed location.

In some embodiments, the state of the license associated with the at least one service is based on a duration of the rental of the fixed location.

In some embodiments, the machine readable instructions stored on the non-transitory computer-readable medium or media, when executed by the one or more processors, cause the one or more processors to perform further operations comprising: receiving an indication that the user activated the device at the fixed location; and configuring the availability of the at least one service on the device based on the received indication.

In some embodiments, the machine readable instructions stored on the non-transitory computer-readable medium or media, when executed by the one or more processors, cause the one or more processors to perform further operations comprising: providing a web portal for renters of network-connectable devices to register the network-connectable devices with the system for licensing; or providing a web portal for providers of services associated with network-connectable devices to register the services with the system for licensing; or providing a web portal for users to register with the system for licensing.

In some embodiments, the machine readable instructions stored on the non-transitory computer-readable medium or media, when executed by the one or more processors, cause the one or more processors to perform further operations comprising: providing a web portal for renters of network-connectable devices to register the network-connectable devices with the system for licensing; providing a web portal for providers of services associated with network-connectable devices to register the services with the system for licensing; and providing a web portal for users to register with the system for licensing.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While particular embodiments of the subject matter have thus been described, it is to be appreciated that other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multi-tasking and parallel processing may be advantageous.

What is claimed is:

1. A computer-implemented method for licensing services associated with a network-connectable device, the method comprising:
   receiving a request for rental of a network-connectable device for a user;
   receiving, from the user, a request to purchase one or more services associated with the device, wherein the request to purchase one or more services is received in conjunction with the request for rental of the device or separately from the request for rental of the device;
   storing, for the user, (i) data about the rental of the device, (ii) data about a license associated with each of the one or more services purchased by the user, and (iii) data about an identity of the user;
   determining an identity of the user based on data received from the device;
   determining at least one compatible service, of the one or more services purchased by the user, wherein the at least one compatible service is determined based on at least one characteristic of the device; and
   enabling the at least one compatible service on the device based on a state of the license associated with the at least one compatible service.

2. The method of claim 1, wherein the request to purchase one or more services associated with the device is received subsequent to receiving the request for rental of the device.

3. The method of claim 1, wherein determining at least one compatible service, of the one or more services purchased by the user, includes:
obtaining a device identifier associated with the device;
using the device identifier to determine one or more services associated with the device; and
determining the at least one compatible service, of the one or more services associated with the device, based on the at least one characteristic of the device.

4. The method of claim 1, wherein determining an identity of the user includes:
receiving, at the device to be rented by the user, via a short-range communication channel, a unique identifier associated with the user from a mobile device operated by the user; and
determining, by the device to be rented by the user, a user identification mapped to the unique identifier in a directory database.

5. The method of claim 1, wherein the network-connectable device belongs to a class of network-connectable devices, further comprising:
creating a mapping of the class of network-connectable devices to a class of services compatible with the class of devices; and
storing the mapping in (i) a database associated with at least one provider of the class of services or (ii) a database associated with the class of devices.

6. The method of claim 1, wherein
the request for rental of the network-connectable device is received at a web portal associated with a renter of the device, and
the request to purchase one or more services associated with the device is received at a web portal associated with at least one provider of the one or more services.

7. The method of claim 1, wherein the network-connectable device is one of a plurality of network-connectable devices associated with a fixed location.

8. The method of claim 7, wherein
the request for rental of the network-connectable device is included in a request for rental of the fixed location; and
the request to purchase one or more services associated with the device is received in conjunction with the with the request for rental of the fixed location or separately from the request for rental of the fixed location.

* * * * *